US008365377B1

(12) United States Patent
Basiliere

(10) Patent No.: US 8,365,377 B1
(45) Date of Patent: Feb. 5, 2013

(54) PIPE JOINING TOOL

(76) Inventor: James Basiliere, Dalton, MA (US)

( * ) Notice: Subject to any disclaimer, the term of this patent is extended or adjusted under 35 U.S.C. 154(b) by 347 days.

(21) Appl. No.: 12/806,839

(22) Filed: Aug. 23, 2010

Related U.S. Application Data

(60) Provisional application No. 61/274,817, filed on Aug. 21, 2009.

(51) Int. Cl.
*B23P 11/00* (2006.01)
*B25B 27/14* (2006.01)

(52) U.S. Cl. ............ 29/243.55; 29/278; 269/6; 269/143

(58) Field of Classification Search ................. 29/243.5, 29/243.55, 257, 270, 276, 278; 81/176.1, 81/176.2; 269/3, 6, 95, 143, 249
See application file for complete search history.

(56) References Cited

U.S. PATENT DOCUMENTS 634,276 A * 10/1899 Shaw ................................ 269/6
1,557,370 A * 10/1925 Lane ............................... 29/270
1,842,142 A * 1/1932 Becker ............................ 269/95
2,207,342 A * 7/1940 Eastus ............................. 29/271
4,501,055 A 2/1985 George
4,748,730 A 6/1988 George
5,003,848 A * 4/1991 Ceccucci, Jr. ................ 81/176.2
D327,205 S 6/1992 Jones
5,121,624 A * 6/1992 Haughian .................. 72/409.19
5,365,808 A * 11/1994 Palmer ......................... 81/176.1
6,776,403 B1 * 8/2004 Neufeld ............................ 269/6
7,189,234 B2 * 3/2007 Zucherman et al. .......... 606/249
7,249,752 B1 * 7/2007 Foley ............................. 254/23

FOREIGN PATENT DOCUMENTS

DE 3606429 A1 * 9/1987

* cited by examiner

*Primary Examiner* — Brian Glessner
*Assistant Examiner* — Joseph J Sadlon

(57) ABSTRACT

The tool (10) includes first and second pipe securing heads (12, 30), each having downward facing C-shaped frames (14, 16) and pipe securing clamps (16, 36) secured within the frames (14, 16) for selectively and detachably securing the pipe securing heads (12, 20) to sections of pipes (18, 36). A pivot rod (48) is pivotally secured between necks (20, 38) of the heads (12, 30), and handles (54, 56) are secured to the necks (20, 38). The handles (54, 56) and pivot rod (48) are configured so that, after securing the clamps (16, 36) within the frames (14, 16) to adjacent first and second pipes (18, 36), movement of the handles (54, 56) toward or away from each other causes the pipe securing heads (12, 30) to move the pipes (18, 36) to be joined together or separated.

15 Claims, 23 Drawing Sheets

PIPE JOINING TOOL

CROSS REFERENCE TO RELATED APPLICATION

This Application claims the benefit of U.S. Provisional Patent Application Ser. No. 61/274,817 that was filed on Aug. 21, 2009, entitled "Pipe Joining Tool".

TECHNICAL FIELD

This disclosure relates to apparatus and tools utilized in securing cylindrical shaped, tubular structures together, and particularly relates to a tool for joining pipes together.

BACKGROUND ART

It is well known that pipe's, and pipe-shaped objects are routinely used for transporting fluids both above and underground. For example, oil refineries use a vast array of above ground pipes, while underground pipes transport municipal water supplies, irrigation water, drainage water, etc. Above ground pipes may be readily joined together by well known methods including threaded mechanical connections, welding, bonding etc. However, joining underground pipes together necessarily requires substantial labor, risks and costs. (For purposes herein, the words "pipe" and "pipes" are to include all forms of fluid transporting structures, including straight pipe sections, cylindrical pipes, couplings, fittings, joints, etc.)

For example, in transporting irrigation water to and drainage water away from agricultural sites, it is common that a mechanized trenching machine will form a narrow, deep trench in the soil. The depth of the trench may be a function of a "frost-line", if the water is to pass through the pipe during the winter months. Such trenches may run as deep as four feet or more. If freezing is not a concern, the trenches will still need to be at least two feet to minimize any possible damage to the underground pipe by activity above the pipe. Sections of straight pipe are typically laid in the trench, and then two sections are joined together.

Smooth-wall irrigation water pipe may be made of a type of polymer compound that is joined by sliding an open end of the pipe into a larger receiving end of a coupler. Typically a compression O-ring type of seal is secured within the receiving end of the coupler to provide a fluid seal. The adjacent section of straight pipe is then inserted into an opposed receiving end of the coupler. Some such pipes may simply be joined by forcing a narrow male-end into a wider female-end of an adjacent pipe, using an O-ring seal or solvent bond to seal the pipes together. Corrugated pipe, such as shown schematically in FIG. 4, that is frequently used to transport underground drainage water, may be joined in a similar manner to that described above, using corrugated couplers or male-end female-end insertions, O-ring seals, etc.

When such smooth or corrugated pipe sections are at the bottom of trenches, securing two sections of pipe together requires a laborer to either stand in or reach into the trench and then use manual force to join the two pipe sections together. For a twenty-foot or longer section of pipe, adequate joining force frequently requires two or more laborers using manual effort to force the pipe sections together. Not only does this require significant labor cost in terms of labor hours, but it also gives rise to substantial risks of disrupting the trench by cave-ins of trench walls. Additionally, soil particles may accumulate adjacent open pipe ends as they are forced together so that some such soil particles may enter and remain in the open pipes, causing further costs in purging contaminants from the joined pipe sections. Where such trenches are below a frost-line of for example four feet, substantial costs are incurred to make an entire trench sufficiently wide to facilitate manual labor within the trench that is necessary to join sections of pipe together.

Known efforts to join pipes in confined working areas typically include an operating lever connected to a chain or cable. The chain is wrapped around one end and connected to the lever that is secured to the other or mating end. The lever then is moved to draw the chain and pipe secured thereto into the mating end. An example of a pipe joining tool appropriate for confined working areas is shown in U.S. Pat. No. 4,501,055 that issued on Feb. 26, 1985 to George. The apparatus disclosed in George includes a first pipe engaging member having a C-shaped clamp secured in abutment with a collar on a first pipe section and handle with a winch and pulleys secured to the handle. A cable secured to the winch engages an adjoining second pipe section, and the winch is wound manually to draw the second pipe section into the first pipe section. A more recent pipe joining tool including an elongate handle and a Y-shaped pipe-collar engaging clamp end is disclosed in U.S. Design Patent No. Des. 327,205 that issued on Jun. 23, 1992 to Jones. A chain is secured above the Y-shaped clamp end for pulling a second pipe toward the first pipe to which the clamp end is secured upon pivoting of the handle away from the second pipe. A rigid strut may replace the chain and impact the second pipe to decouple joined pipes upon pivoting of the handle toward the second pipe.

Such known pipe joining tools for working in confined work spaces such as deep trenches, however, still require complicated mechanisms that are susceptible to breaking, that are costly, and that also require manual application of pipe engaging chains, cables, engaging clamps, securing tools, etc. This gives rise to further risks of cave-ins of trenches, contamination of open pipe ends, and breakage of the tools.

Consequently there is a need for an efficient apparatus and method for joining pipes together.

SUMMARY OF THE DISCLOSURE

The disclosure is a pipe joining tool for joining pipes together. The tool includes a first pipe securing head having a first downward facing C-shaped frame and a first pipe securing clamp secured within the first downward facing C-shaped frame for selectively and detachably securing the first pipe securing head to a first pipe. A first neck has a bottom end and an opposed top end wherein the bottom end is secured to a central portion of the first downward facing C-shaped frame. The top end of the neck extends away from the first frame in a direction away from a first central opening defined by the first downward facing C-shaped frame. The pipe joining tool also includes a second pipe securing head that is virtually identical to the first head. The second pipe securing head includes a second downward facing C-shaped frame and a second pipe securing clamp that is secured within the second downward facing C-shaped frame for selectively and detachably securing the second pipe securing head to a second pipe. The second pipe securing head also has a second neck that also has a bottom end and an opposed top end. The bottom end is secured to a central portion of the second downward facing C-shaped frame and the top end extends away from the second frame in a direction away from a second central opening defined by the second downward facing C-shaped frame.

The pipe joining tool also includes a pivot rod wherein a first end of the rod is pivotally secured to the first neck between the bottom end and the top end of the first neck. The pivot rod also has an opposed second end that is pivotally secured to the second neck between the bottom end and the top end of the second neck. A first handle is secured to the top end of the first neck and the handle extends away from the first neck in a direction away from the central opening defined by the first downward facing C-shaped frame. A second handle is secured to the top end of the second neck and extends away from the second neck in a direction away from the central opening defined by the second downward facing C-shaped frame. The first and second handles and pivot rod are configured so that movement of the first and second handles away from each other causes the first and second pipe securing heads to pivot about the pivot rod to move toward each other, and movement of the first and second handles toward each other causes the first and second pipe securing heads to pivot about the pivot rod and thereby move away from each other.

In use of the pipe joining tool, a laborer holds one handle in each hand, much like a standard two-handled hole-digging shovel, and then secures one of the first or second pipe securing clamps over a first pipe near an end of the first pipe. The laborer then secures the handles reasonably close to each other and then places the other of the first or second pipe securing clamps over a second pipe that has been positioned adjacent the first pipe to be joined to the first pipe. The laborer then simply expands the handles of the pipe joining tool apart to join the first pipe to the second pipe. As stated above, the "first pipe" may be a section of straight pipe, while the "second pipe" may be a coupling configured to receive and produce a fluid seal such as by an O-ring, or the pipes may be a corrugated pipe and a corrugated coupling requiring no fluid seal, such as for drainage water. The present pipe joining tool therefore, provides minimal intrusion into any trench housing the pipes, and more importantly, the pipe joining tool provides enormous mechanical advantage through the lever-and-fulcrum effect of the handles, pivot rod and pipe securing heads. In the event a coupler has a larger diameter than the pipe to which the coupler is to be joined, the diameters of the first and second pipe securing clamps may differ to efficiently engage differing diameters of pipes and/or couplers, etc., being joined.

The first and second pipe securing clamps may be any pipe securing clamp means for selectively and detachably securing the first or second pipe securing heads to a pipe. Various differing clamp structures within the phrase pipe securing clamp means will be described below. However, it is to be understood that each pipe securing clamp is dimensioned to engage a pipe having a specific width or outer diameter ("O.D."). For example, if the pipe is a specific type of smooth walled, four inch O.D. pipe, then the first and/or second clamp securing means would be dimensioned to slide over and cover about at least fifty percent or more of an outer circumference of the four inch pipe. Similarly if the pipe is an eight-inch O.D. corrugated drainage water pipe, then the first and/or second clamps would be dimensioned to slide over and cover about an outer fifty percent of an outer circumference of the eight inch corrugated pipe. (For purposes herein, the word "about" is to mean plus or minus 20%.)

In an alternative embodiment the first and second pipe securing clamps are pivotally secured respectively within the first and second downward facing C-shaped frames for limited rotation of the clamps about first and second pivot axes passing between opposed sides of the C-shaped frames supporting the clamps. The first and second pipe securing clamps include pivot stops configured to extend from the clamps into pivot slots defined within the downward facing C-shaped frames to limit pivoting of the clamps. By permitting the pipe securing clamps to pivot about their pivot axes as the pipe securing heads move toward or away from each other, the first and second clamps remain normal to, or perpendicular to a flow axis through the pipes, so that friction applied by the clamps to the pipes does not decrease, and so that the clamps can do no damage to the pipes.

Additionally, the pipe joining tool may include the pivot stops and the pivot slots in each of the first and second pipe securing heads being cooperatively configured to permit pivoting of the pipe securing clamps about their respective pivot axes about twenty degrees above or below a plane defined as extending from their pivot axes and parallel to planes defined by the respective central openings. In a further embodiment, the pipe joining tool may also include a pivot plate pivotally secured to the first or second neck and dimensioned to cover an area at least as big as the central opening of the first or second pipe securing heads. In use of the pivot plate, if the first pipe is a structure having an open end near the end to be joined to the second pipe, such as the first pipe being a short coupling, or a T-joint, etc., then the pivot plate may be pivoted from a storage position adjacent the neck to a blocking position covering the central opening of the first pipe securing head. Blocking the opening prevents any soil particles or related debris from entering the first pipe as the pipe joining tool is used to move the pipes to thereby join the first pipe to the second pipe. When the pipes pulled by the tool to be adjacent each other, the pivot plate is pivoted back from a blocking position to a storage position so that the smaller diameter pipe end may be drawn into the larger diameter pipe end to join the pipes with no or very limited contamination by soil particles.

As described in more detail below, the pipe securing clamps means may include: 1. a corrugated pipe ring clamp; 2. a corrugated pipe reverse ring clamp; 3. a smooth-wall pipe reverse ring clamp; 4. a smooth-wall pipe rubber lip clamp; 5. a smooth-wall pipe rubber rings clamp; 6. a smooth-wall pipe flat rubber clamp; 7. a smooth-wall pipe outside roller clamp; and, 8. a smooth-wall pipe ball and socket clamp. The present disclosure also includes methods of using the described pipe joining tool.

PREFERRED EMBODIMENTS OF THE DISCLOSURE

Figure 1:
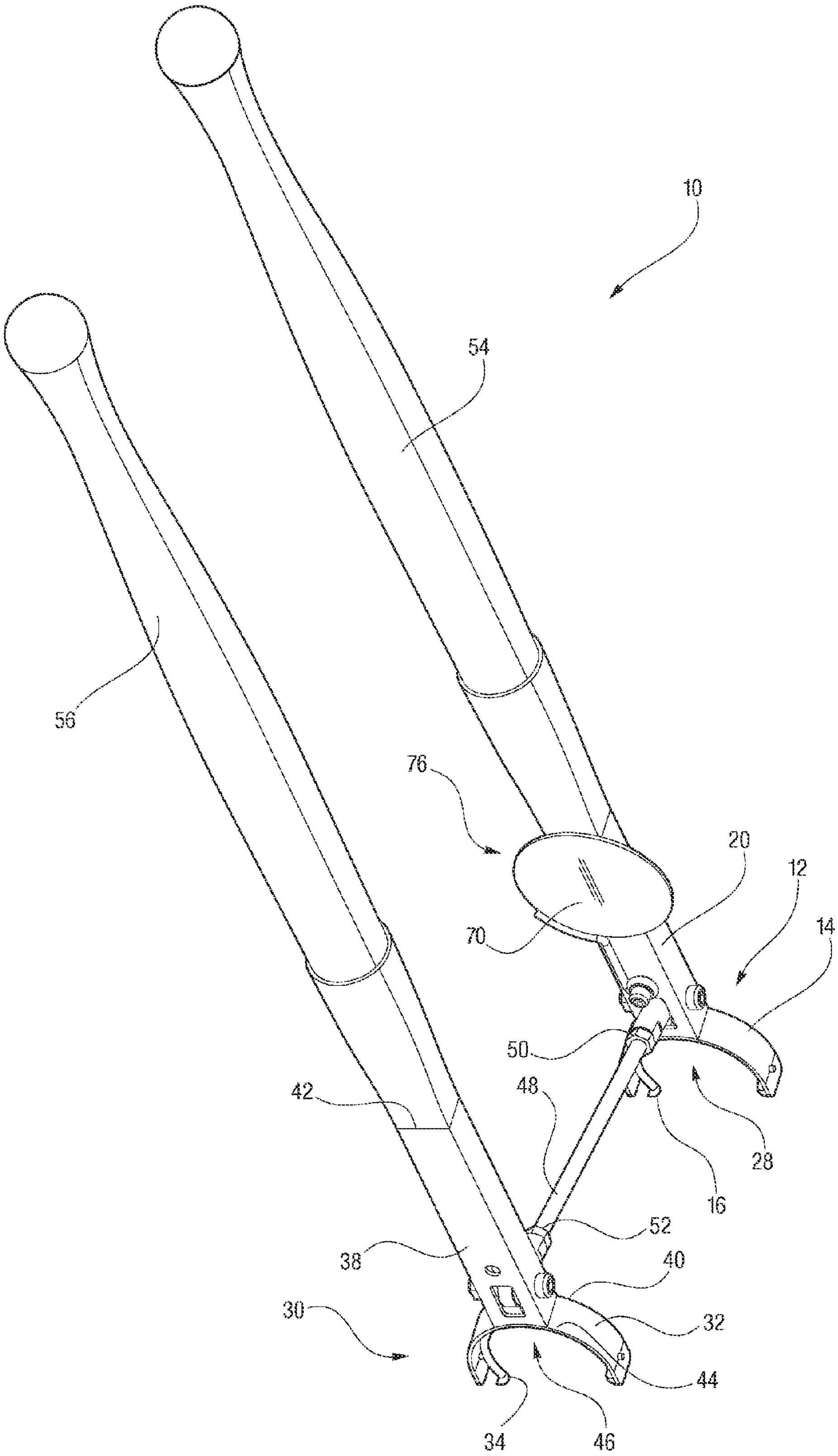
FIG. 1 is a perspective view of a pipe joining tool constructed in accordance with the present disclosure.

Referring to the drawings in detail a perspective view of a pipe joining tool of the present disclosure is shown in FIG. 1 and is generally designated by the reference numeral 10. The pipe joining tool 10 includes a first pipe securing head 12 having a first downward facing C-shaped frame 14 and a first pipe securing clamp 16 (seen best in FIG. 2) secured within the first downward facing C-shaped frame 14 for selectively and detachably securing the first pipe securing head 12 to a first pipe 18, shown in FIG. 4. A first neck 20 of the first pipe securing head 12 has a bottom end 22 and an opposed top end 24, wherein the bottom end 22 is secured to a central portion 26 of the first downward facing C-shaped frame 14. The top end 24 of the neck 20 extends away from the first frame 14 in a direction away from a first central opening 28 defined by the first downward facing C-shaped frame 14.

The pipe joining tool 10 also includes a second pipe securing head 30 (shown in FIG. 1) that is virtually identical to the first head 12, except in the possible dimensions of the second head 30. The second pipe securing head 30 includes a second downward facing C-shaped frame 32 and a second pipe securing clamp 34 that is secured within the second downward facing C-shaped frame 32 for selectively and detachably securing the second pipe securing head 30 to a second pipe 36, shown in FIG. 4. The second pipe securing head 30 also has a second neck 38 that also has a bottom end 40 and an opposed top end 42. The bottom end 40 is secured to a central portion 44 of the second downward facing C-shaped frame 32 and the top end 42 extends away from the second frame 32 in a direction away from a second central opening 46 defined by the second downward facing C-shaped frame 32.

The pipe joining tool 10 also includes a pivot rod 48 shown best in FIG. 1 wherein a first end 50 of the rod 48 is pivotally secured to the first neck 20 between the bottom end 22 and the top end 24 of the first neck 20. The pivot rod 48 also has an opposed second end 52 that is pivotally secured to the second neck 38 between the bottom end 40 and the top end 42 of the second neck 38. A first handle 54 is secured to the top end 24 of the first neck 20 and the handle 54 extends away from the first neck in a direction away from the first central opening 28 defined by the first downward facing C-shaped frame 14. A second handle 56 is secured to the top end 42 of the second neck 38 and extends away from the second neck 38 in a direction away from the second central opening 46 defined by the second downward facing C-shaped frame 32.

The first and second handles 54, 56 and pivot rod 48 are configured so that movement of the first and second handles 54, 56 away from each other causes the first and second pipe securing heads 12, 30 to pivot about the first and second ends 50, 52 of the pivot rod 48 to move toward each other. Similarly, movement of the first and second handles 54, 56 toward each other causes the first and second pipe securing heads 12, 30 to pivot about the first and second pivot rod ends 50, 52 of the pivot rod 48 and thereby move away from each other.

Figure 4:
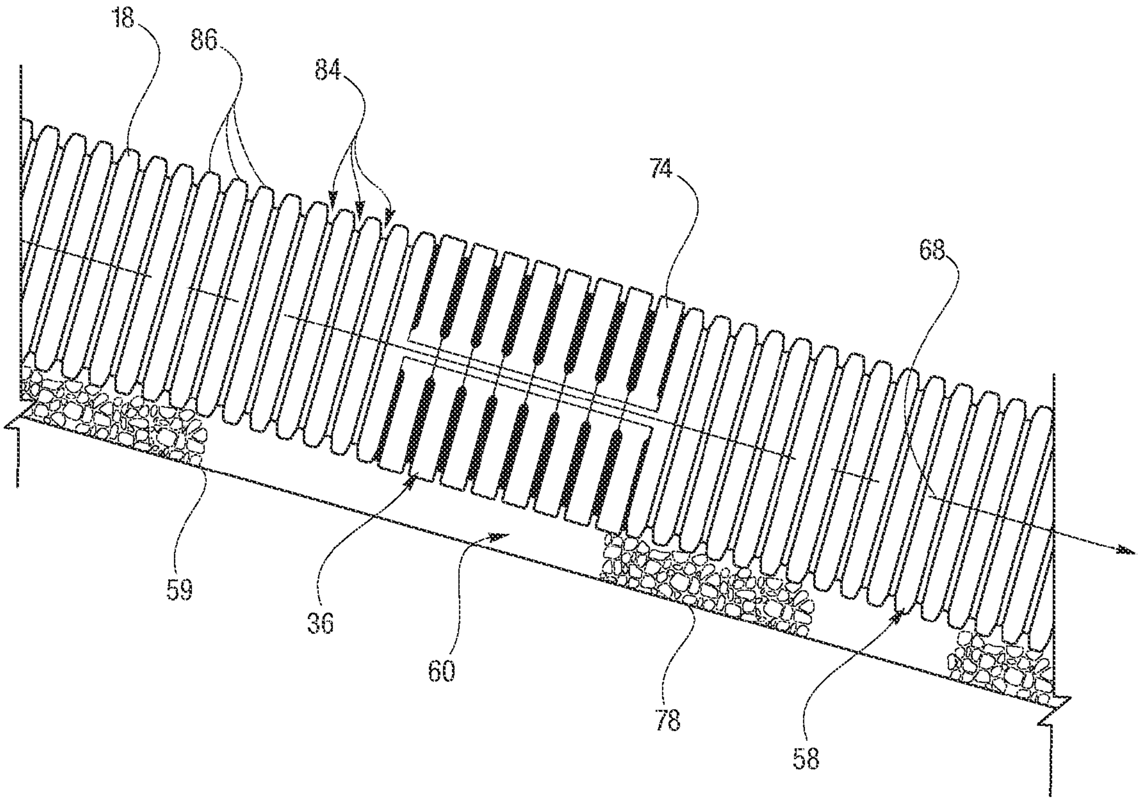
FIG. 4 is side, fragmentary, plan view of a first corrugated pipe, a second corrugated pipe and a third corrugated pipe.

In use of the pipe joining tool 10, a laborer (not shown) holds one handle 54, 56 in each hand and then secures, for example, the first pipe 18 securing clamp 16 over the first pipe 18 near an end (not shown) of the first pipe 18. The laborer then secures the handles 54, 56 reasonably close to each other and then places the second pipe securing clamp 34 over the second pipe 36 that has been positioned adjacent the first pipe 18. The laborer then simply expands the handles 54, 56 of the pipe joining tool 10 apart to join the first pipe 18 to the second pipe 36 (as shown in FIG. 4). FIG. 4 shows a simplified plan view of the first pipe 18 as if it were standard corrugated drainage water pipe 18 wherein excess water drains through drainage stone 59 into small openings (not shown) between the corrugations of the pipe 18. The drainage water within the pipe 18 then flows downward with respect to gravity to be drained out of a drainage area (not shown). The second pipe 36 in FIG. 4 is shown as a standard coupling 36 dimensioned to receive several of the corrugations of the first pipe 18 and to also receive several corrugations of the third pipe 58, to thereby join the pipes 18, 36, 58 together.

Figure 2:
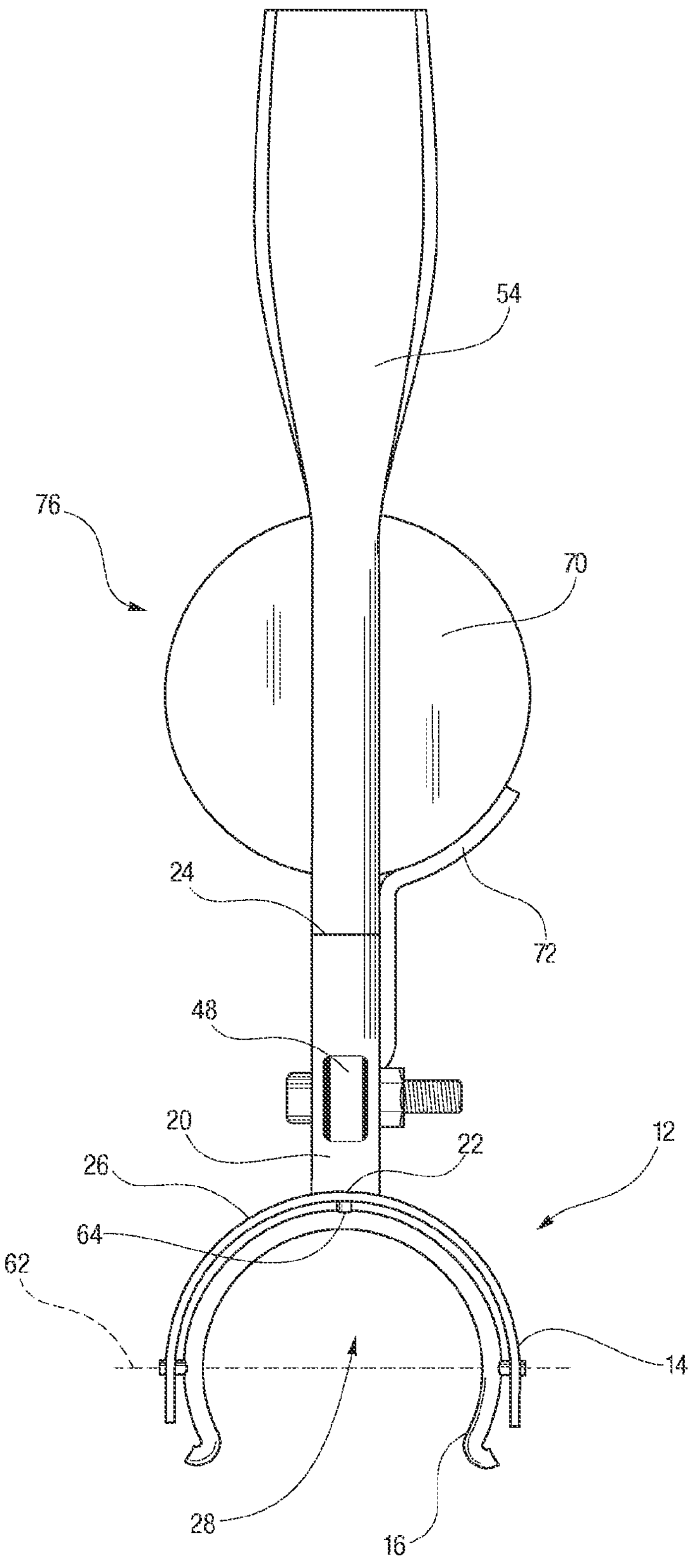
FIG. 2 is a fragmentary front plan view of a first handle, neck, and pipe securing head of the present pipe joining tool.
Figure 3:
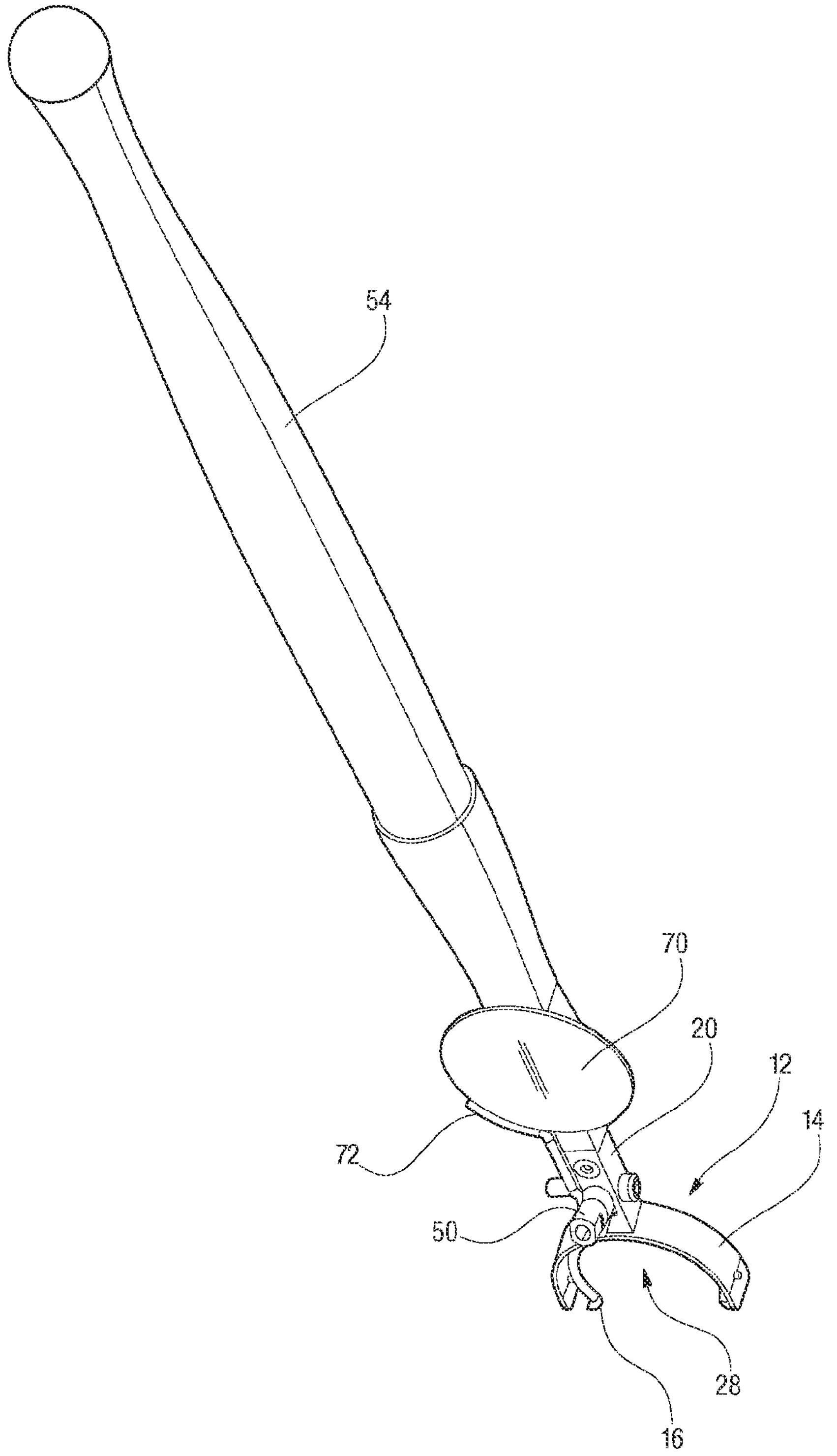
FIG. 3 is a raised perspective rear view of the FIG. 2 handle, neck and pipe securing head.

The present pipe joining tool 10 therefore, provides minimal intrusion into any trench 60 housing the pipes 18, 36, 58, and more importantly, the pipe joining tool 10 provides enormous mechanical advantage through the lever-and-fulcrum effect of the first and second handles 54, 56, the pivot rod 48 joining the handles 54, 56 together in a pivoting relationship, and the first and second pipe securing heads 12, 30. While the above description in FIGS. 1-3 show the pipe joining tool 10 as if the first head 12, first neck 20 and first handle 54, are separate components, it is to be understood that those components may be manufactured and assembled separately or as an integral unit. It is anticipated that in preferred embodiments of the tool 10, the first and/or second heads 12, 30, or the first and/or the second clamps 16, 34, may be readily separated from their respective necks, heads, 12, 20, necks 20, 38, or respective handles 54, 56, to be replaced by alternative heads (not shown) to efficiently utilize the tool 10 on a variety different sized pipes or combinations of different sized pipes (not shown). It is also pointed out that the handles 54, 56 may be configured for actuation by non-manual means. For example, the handles 54, 56 may be manufactured to efficiently mate with hydraulic, mechanical, electro-mechanical, etc., actuators to move the pipe securing heads 12, 30 as described above.

Figure 5:
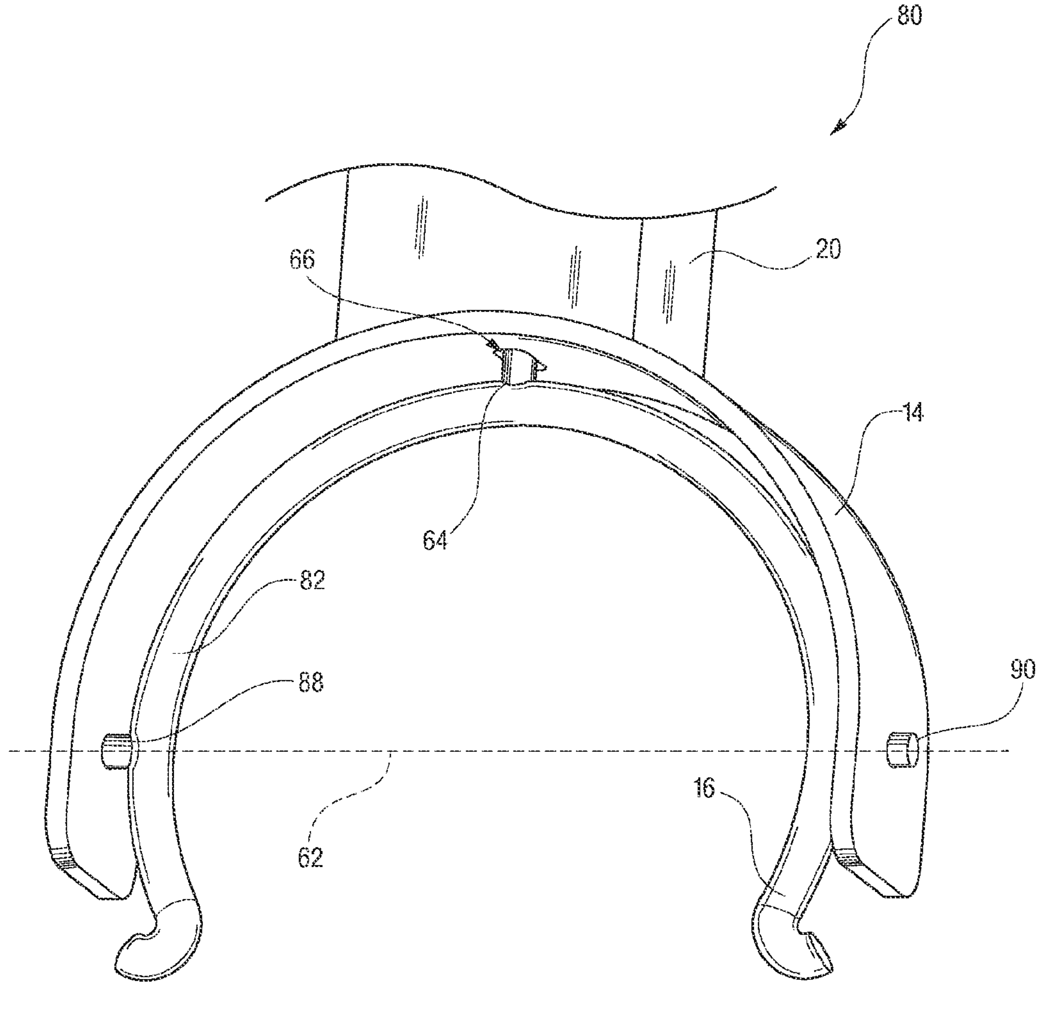
FIG. 5 is a front perspective view of a corrugated pipe ring clamp.

The first and second pipe securing clamps 16, 34 may be pivotally secured respectively within the first and second downward facing C-shaped frames 14, 32 for limited rotation of the clamps within the frames 14, 32. For example, as shown in FIGS. 2 and 5 the first clamp 16 may be configured to pivot about a first pivot axis 62 passing between opposed sides of the C-shaped frames supporting the first clamp 16. The first pipe securing clamp 16 includes a pivot stop 64 configured to extend from the clamp 16 into a pivot slot 66 (shown best in FIG. 5) defined within the downward facing C-shaped frame 14 to limit pivoting of the first pipe securing clamp 16.

Although the second pipe securing clamp 34 and other clamps described below may not clearly show a pivot stop and cooperative pivot slot, it is to be understood that all clamps 16, 34, and corresponding frames 14, 32 may have a pivot stop 64 and a pivot slot 66. By permitting the pipe securing clamps 16, 34 to pivot about the pivot axis 62 as the pipe securing heads 12, 30 move toward or away from each other, the first and second clamps 16, 34 remain normal to a flow axis 68 (shown in FIG. 4) through the pipes 18, 36, 58, so that friction applied by the clamps 16, 34 to the pipes 18, 36, 58 does not decrease and so that the clamps 16, 34 can do no damage to the pipes 18, 36, 58. Pivoting of the securing clamps 16, 34 effectively converts angular motion of the closing or opening of the handles 54, 56 to linear motion of the pipe securing clamps 16, 34 toward and away from each other. In a preferred embodiment, the first pivot stop 64 and the first pivot slot 66 are cooperatively configured to permit pivoting of the first pipe securing clamp means 16 about the first pivot axis 62 about ten degrees above or below a plane defined as extending from the first pivot axis 62 and parallel to a plane defined by the first central opening 26.

In a further embodiment, the pipe joining tool 10 may also include a pivot plate 70 (shown in FIGS. 1-3) pivotally secured by a pivot bracket 72 to the first or second neck 20, 38 and dimensioned to cover an area at least as big as the central openings 28, 46 of the first or second pipe securing heads 12, 30. FIGS. 1-3 show the pivot plate 70 secured to the first neck 20. In use of the pivot plate 70, if the second pipe 36 is a structure having an open end (not shown), such as a short coupling pipe 36, and prior to securing the third pipe 58 to the coupling pipe 36, so that the coupling pipe 36 would have an open end 74, the pivot plate 70 may be pivoted from a storage position 76 adjacent the neck 20 (shown in FIGS. 1, 2, and 3) to a blocking position covering the central opening 28 of the first pipe securing head 12. Blocking the open end prevents any soil particles 59 or related debris 78 (best shown in FIG. 4) from entering the second pipe 36 as the pipe joining tool 10 is used to move the first and second pipes 18, 36 toward each other to thereby join the first pipe 18 to the second pipe 36. When the pipes 36, 58 are pulled by the tool 10 to be adjacent each other, the pivot plate 70 is pivoted back from the blocking position to the storage position so that the smaller diameter pipe 58 end may be drawn into the larger diameter coupling pipe 36 end to join the pipes 58, 36 with no or very limited contamination by soil particles 78 within the pipes 58, 36.

The first and second pipe securing clamps 16, 34 may be any pipe securing clamp means for selectively and detachably securing the first or second pipe securing heads 12, 30 to a pipe 18, 36, 58. Various differing clamp structures within the phrase "pipe securing clamp means" will be described in more detail below. However, it is to be understood that each pipe securing clamp means 16, 34 is dimensioned to engage a pipe 18 having a specific width or outer diameter ("O.D."). For example, if the pipe is a specific type of smooth walled, four inch O.D. pipe, then the first and second clamp securing means 16, 34 would be dimensioned to slide over and cover about at least fifty percent or more of an circumference of the four inch pipe 18. Similarly, if the first pipe 18 has a first O.D. that is smaller than an O.D. of the second or coupling pipe 36, the second head 30 and/or second pipe securing clamp means may also define a central opening 46 larger than the central opening 28 of the first clamp securing means 16.

Figure 6:
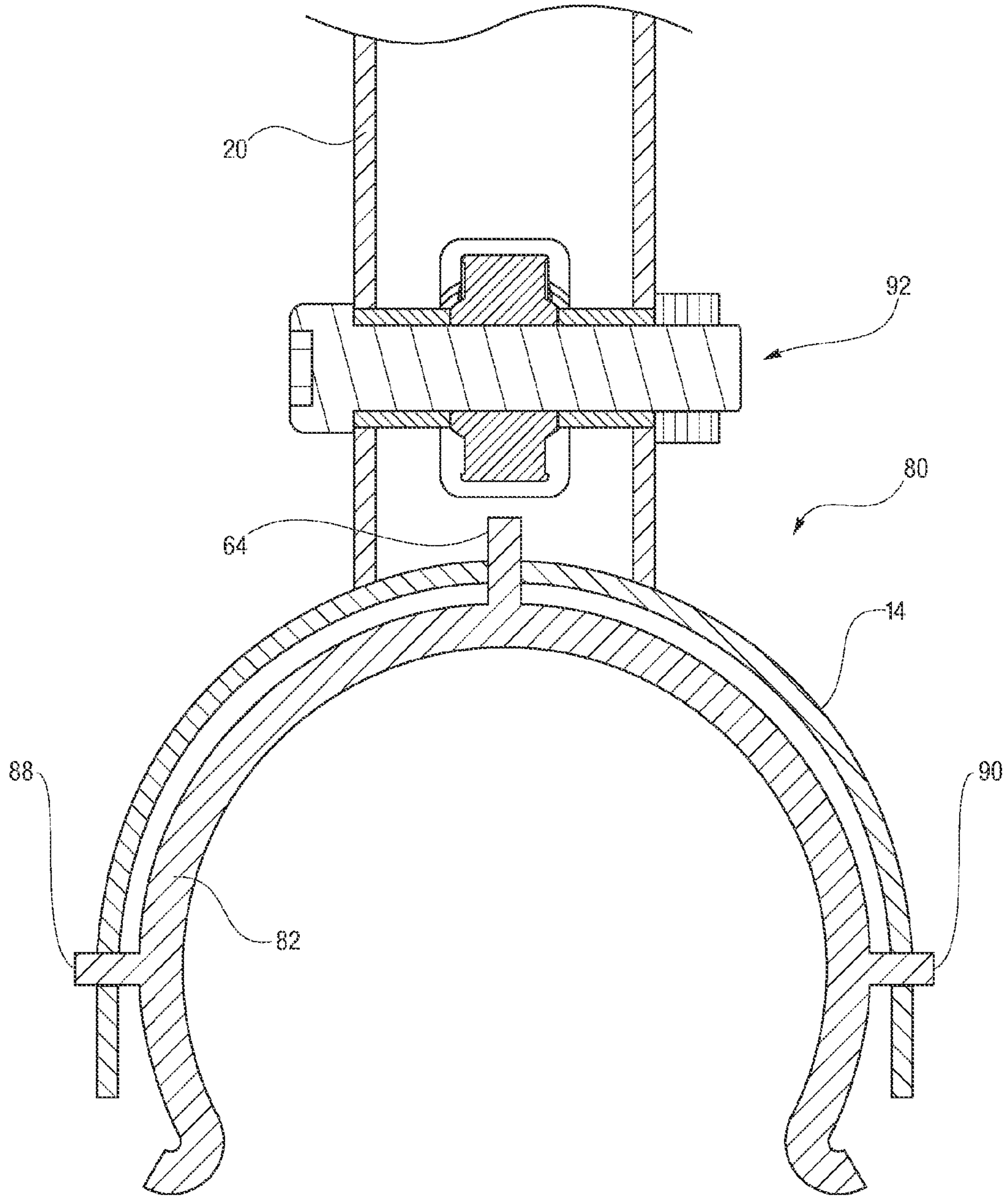
FIG. 6 is a front plan view of a corrugated pipe ring clamp.

FIGS. 5-23 show various additional embodiments of the pipe securing clamp means 16, 34 that will be described below in sequence. FIG. 5 shows a front perspective view of a corrugated pipe ring clamp 80 that has many of the components as described above with respect to first and second clamps 16, 34. Additionally, the ring clamp 80 includes a ring 82 configured to be inserted within valleys 84 (shown in FIG. 4) between corrugations 86 of the first pipe 18 to secure the pipe 18. The ring 82 may have a first securing stud 88 and a second securing stud 90 to secure the ring 82 to the frame 14. FIG. 6 shows the FIG. 5 corrugated pipe ring clamp 80 in plan view and also shows a pivot rod securing mechanism 92 secured to the first neck 20.

Figure 7:
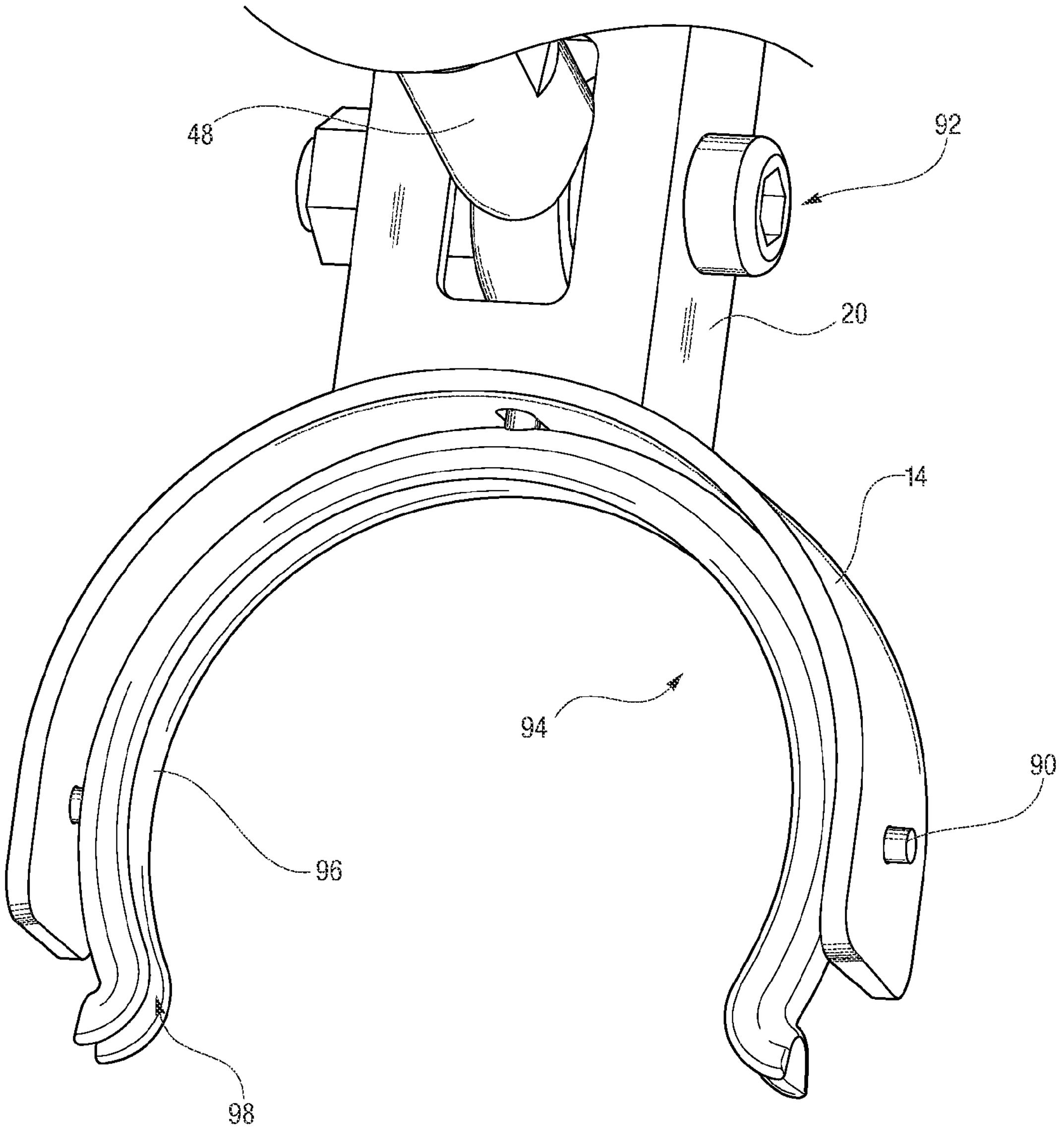
FIG. 7 is a front perspective view of a corrugated pipe reverse ring clamp.
Figure 8:
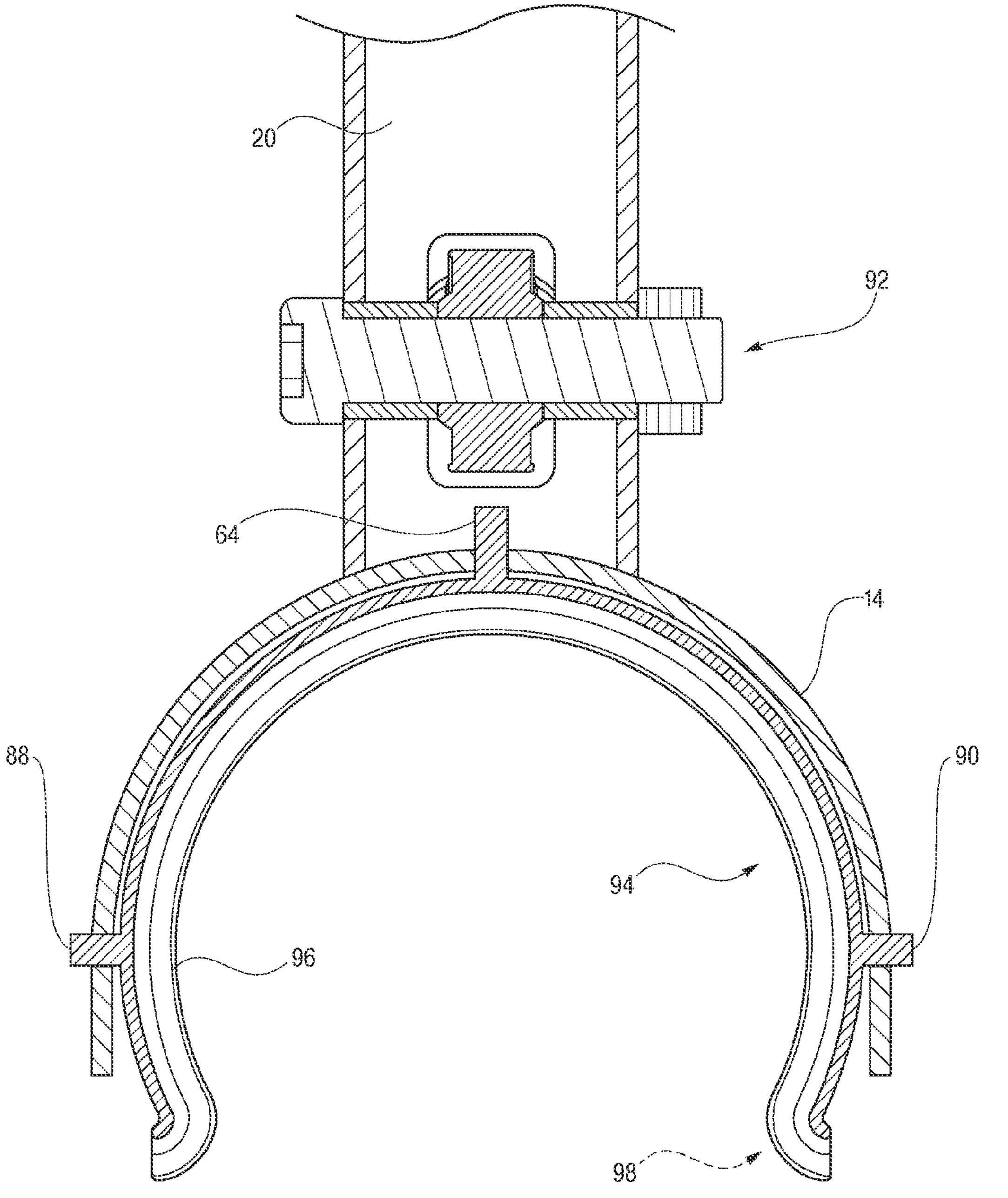
FIG. 8 is a front plan view of a corrugated pipe reverse ring clamp.

FIG. 7 shows a front perspective view of a corrugated pipe reverse ring clamp 94 that includes a reverse ring 96. The reverse ring 96 is configured to have a valley 98 that is dimensioned to receive a corrugation 86 of the pipe 18. This clamp 94 may be useful for corrugated pipes having distinctive or prominent corrugations 86 where the FIGS. 5 and 6 ring 82 would not apply as much friction to the pipe 18 or that would be difficult to extricate from the pipe. FIG. 8 shows a front plan view of the FIG. 6 reverse ring clamp 96.

Figure 9:
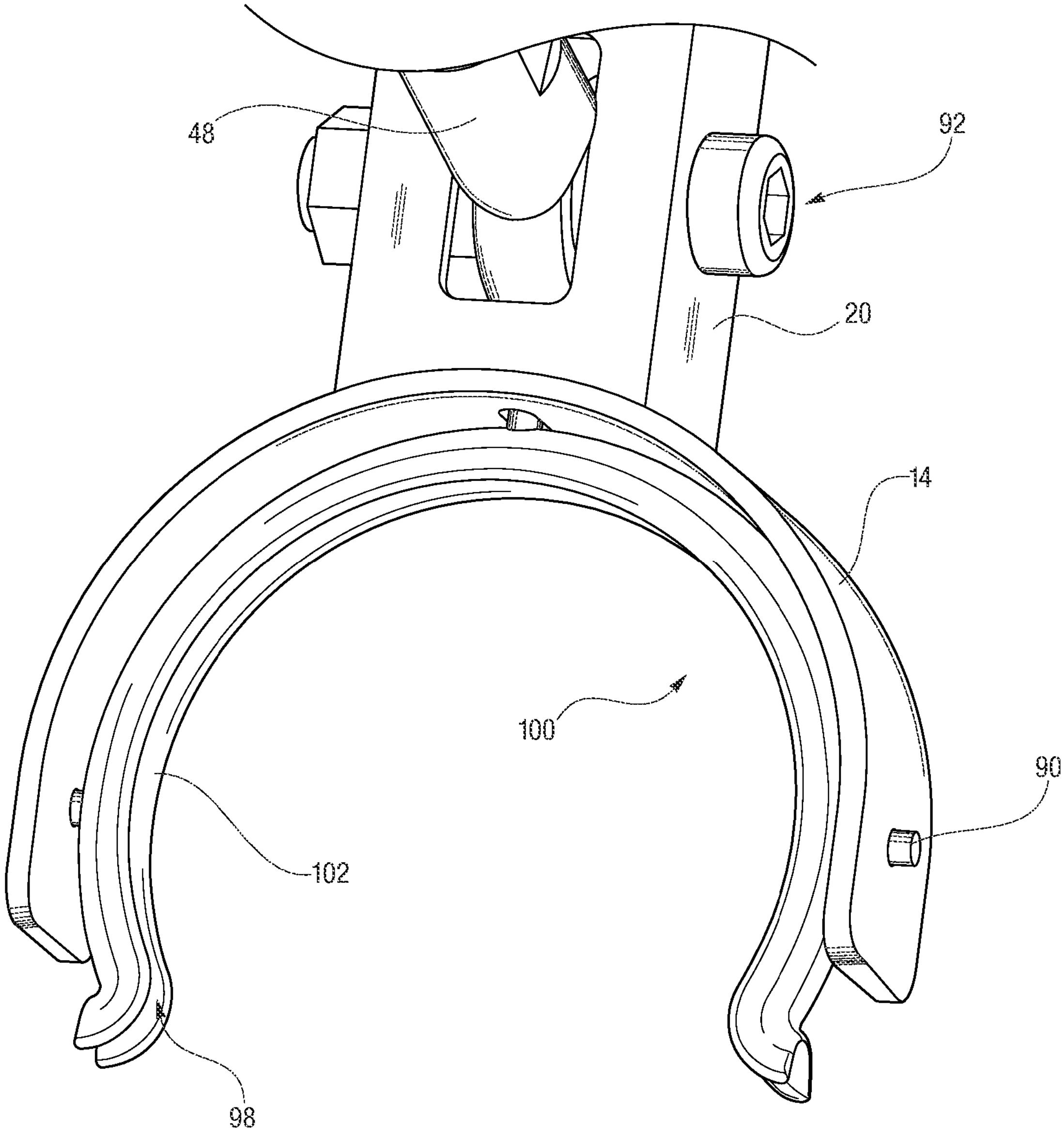
FIG. 9 is a front perspective view of a smooth-wall pipe reverse ring clamp.
Figure 10:
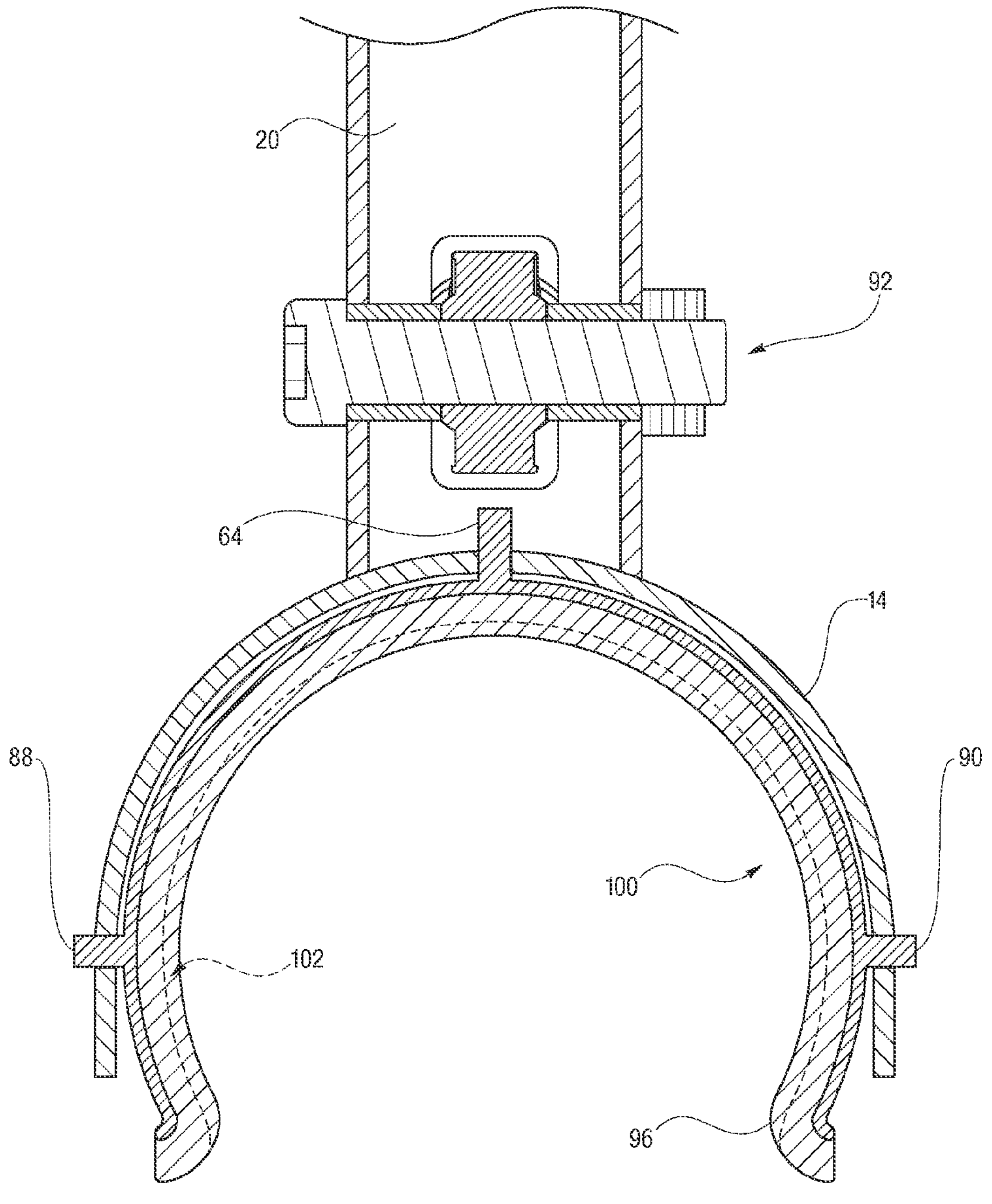
FIG. 10 is a front plan view of a smooth-wall pipe reverse ring clamp.

FIG. 9 shows a smooth-wall reverse ring clamp 100 having the reverse ring 96 secured to the frame 14, wherein the reverse ring 96 also includes a friction rib 102 secured within the valley 98 of the reverse ring 96. By utilizing the same reverse ring 96 component and simply inserting a friction rib 102 dimensioned to be secured within the valley 98 of the reverse ring 96, the pipe joining tool 10 may be quickly converted for use between corrugated pipe 18 and a smooth-wall pipe (not shown) by the efficient expedient by simply removing the friction rib 102 into and out of the valley 98 of the reverse ring 96. The friction rib 102 may be made of any friction enhancing, pliable material, such as rubber or polymer compounds, etc. FIG. 10 shows the smooth-wall reverse ring clamp 100 in a front plan view for purposes of clarity.

Figure 11:
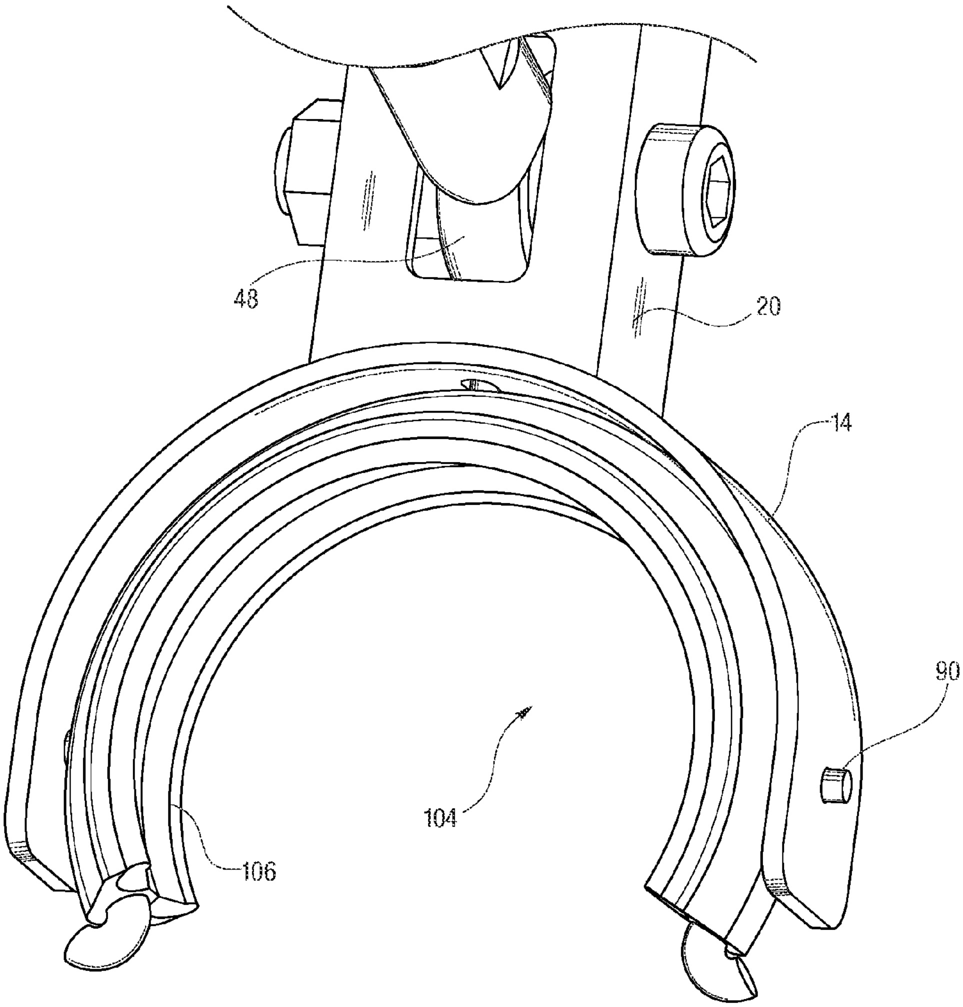
FIG. 11 is a front perspective view of a smooth-wall pipe rubber lip clamp.
Figure 12:
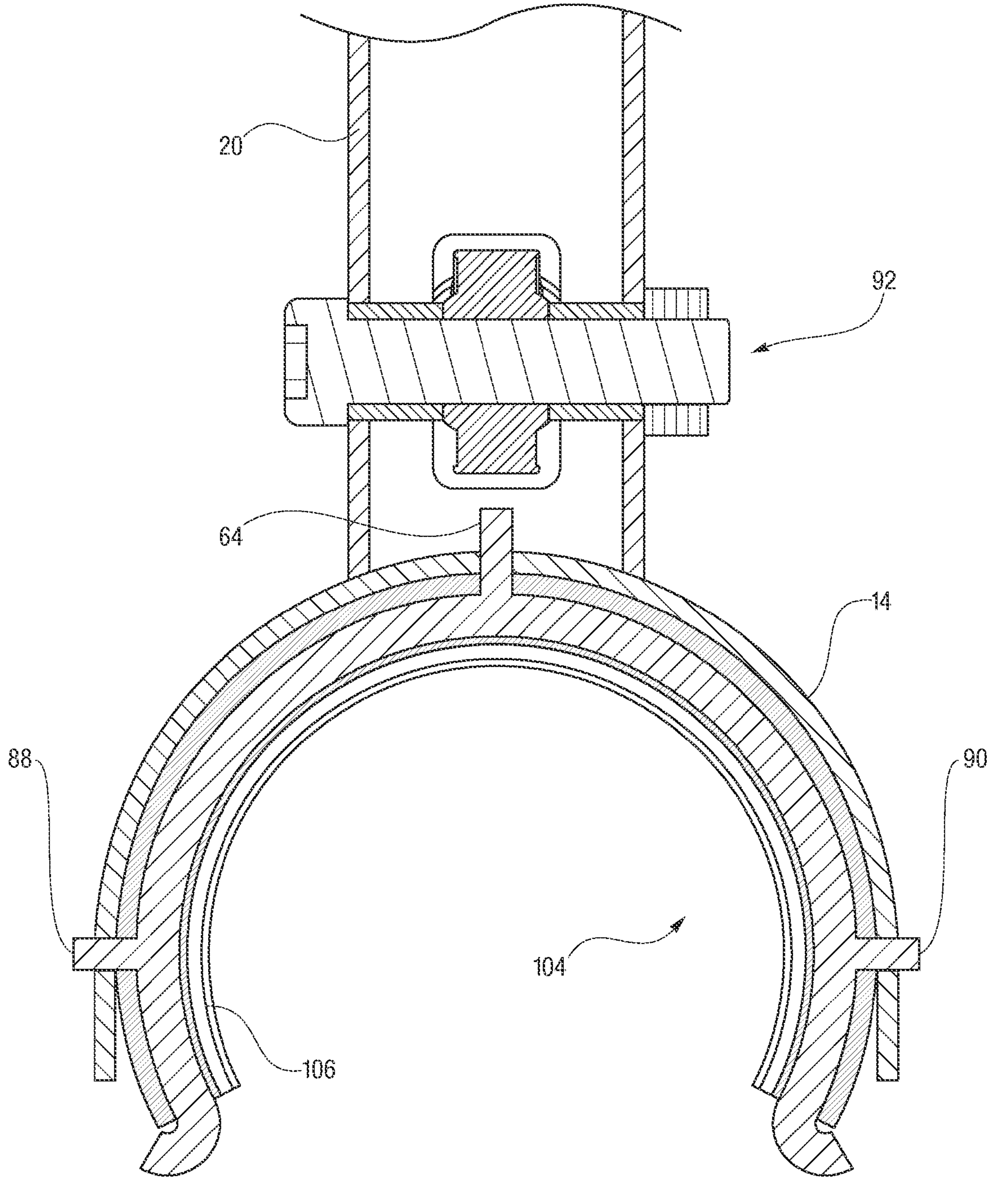
FIG. 12 is a flat plan view of a smooth-wall pipe rubber lip clamp.

FIG. 11 shows a front perspective view of a smooth-wall pipe rubber lip clamp 104 having a rubber lip 106 configured to apply enhanced friction to a smooth-wall pipe by the rubber lip 106 forming substantial and intimate contact with the smooth-wall pipe (not shown). The rubber lip 106 is substantially wider than the friction rib 102 of the smooth-wall reverse ring clamp 100, and has a width diameter at least fifty percent of a width diameter of the first frame 14. FIG. 12 shows a flat plan view of the smooth-wall rubber lip clamp 104 for clarity.

Figure 13:
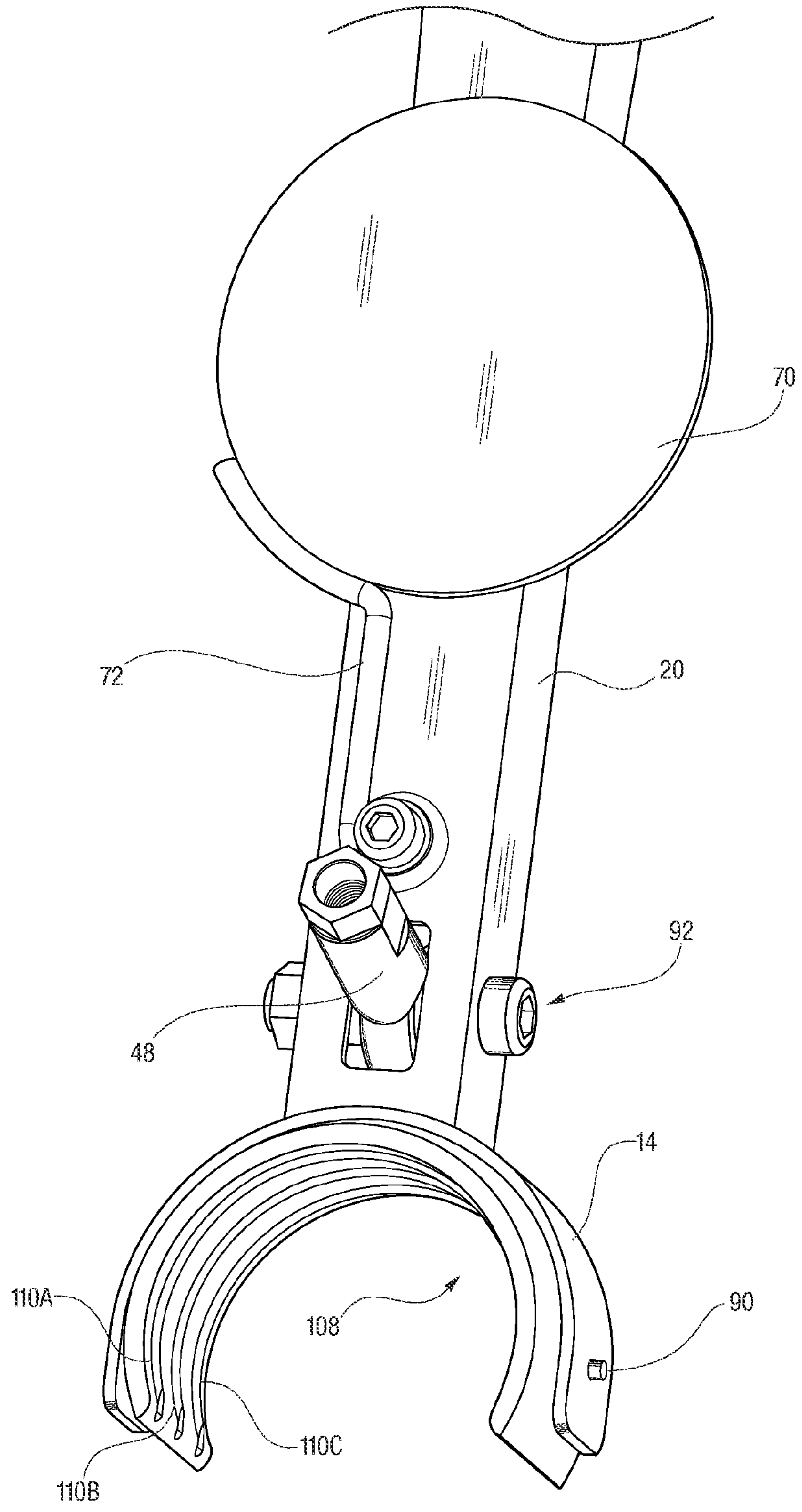
FIG. 13 is a front perspective view of a smooth-wall pipe rubber rings clamp.
Figure 14:
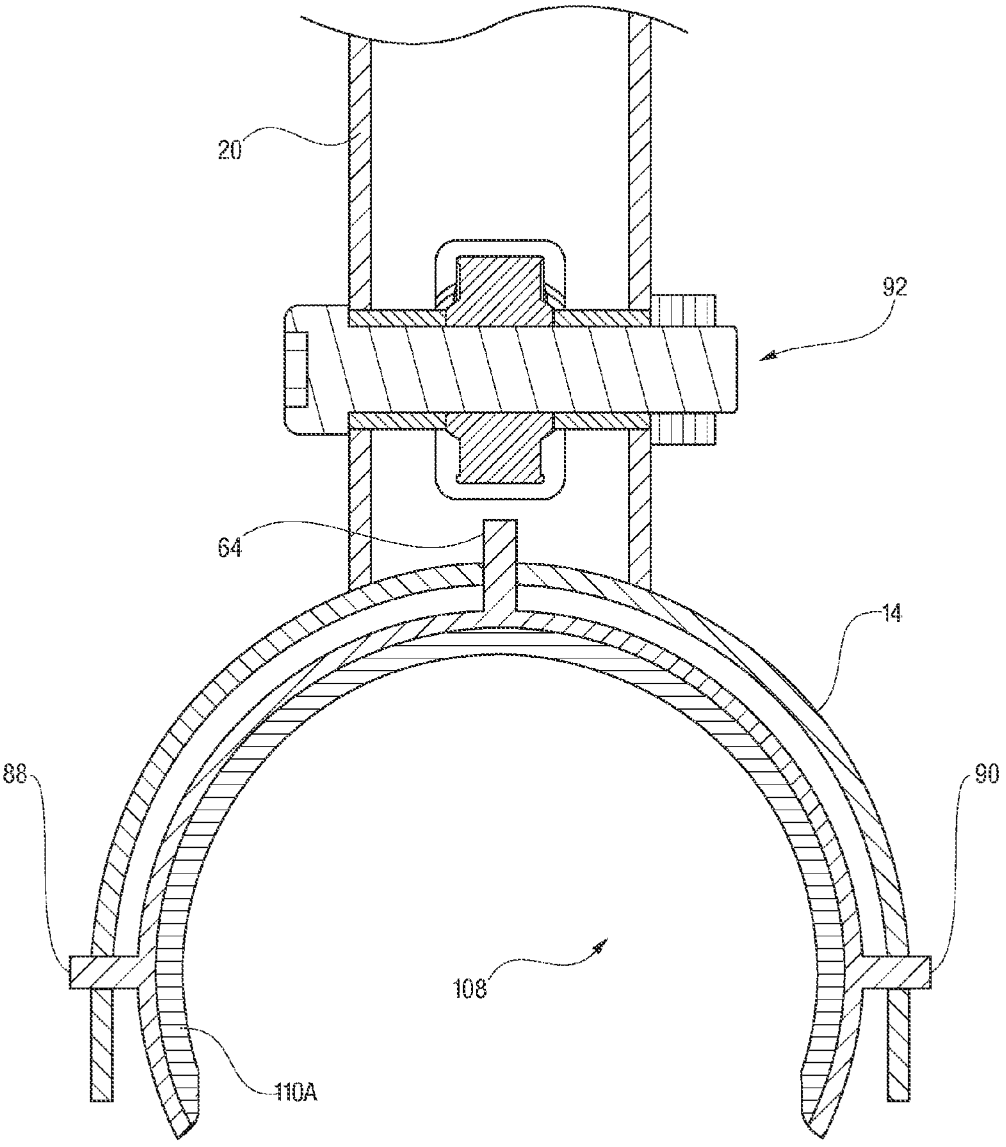
FIG. 14 is a front plan view of a smooth-wall pipe rubber rings clamp.

FIG. 13 shows a front perspective view of a smooth-wall pipe rubber rings clamp 108 having a plurality of friction enhancing rings 110A, 110B, and 110C. The plurality of rings 110A, 110B, 110C provides greater friction on a smooth-wall that may be amenable to higher pressure, lower surface area friction engagement with the clamp 108 compared to a lower pressure, higher surface area clamp 104, depending upon specifics of the surface of the smooth-wall pipe. FIG. 14 shows a front plan view of a smooth-wall pipe rubber rings clamp 108 for clarity.

Figure 15:
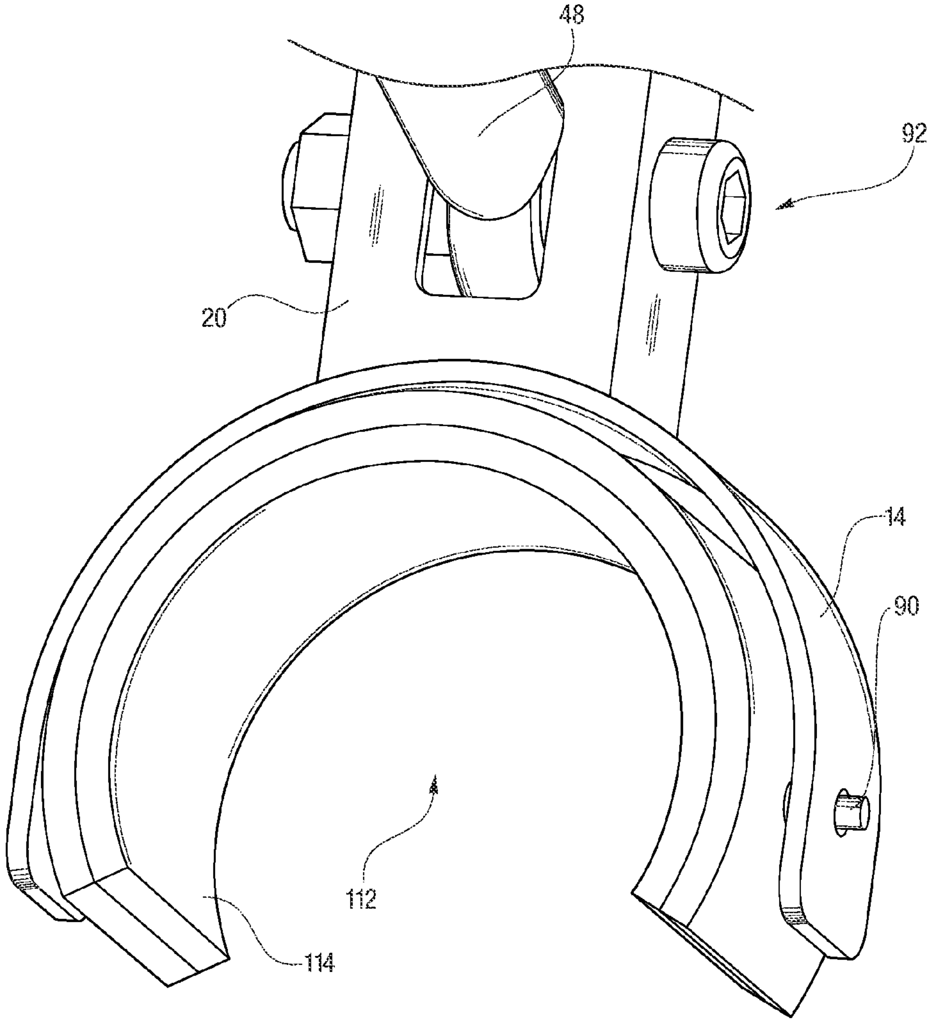
FIG. 15 is a front perspective view of a smooth-wall pipe flat rubber clamp.
Figure 16:
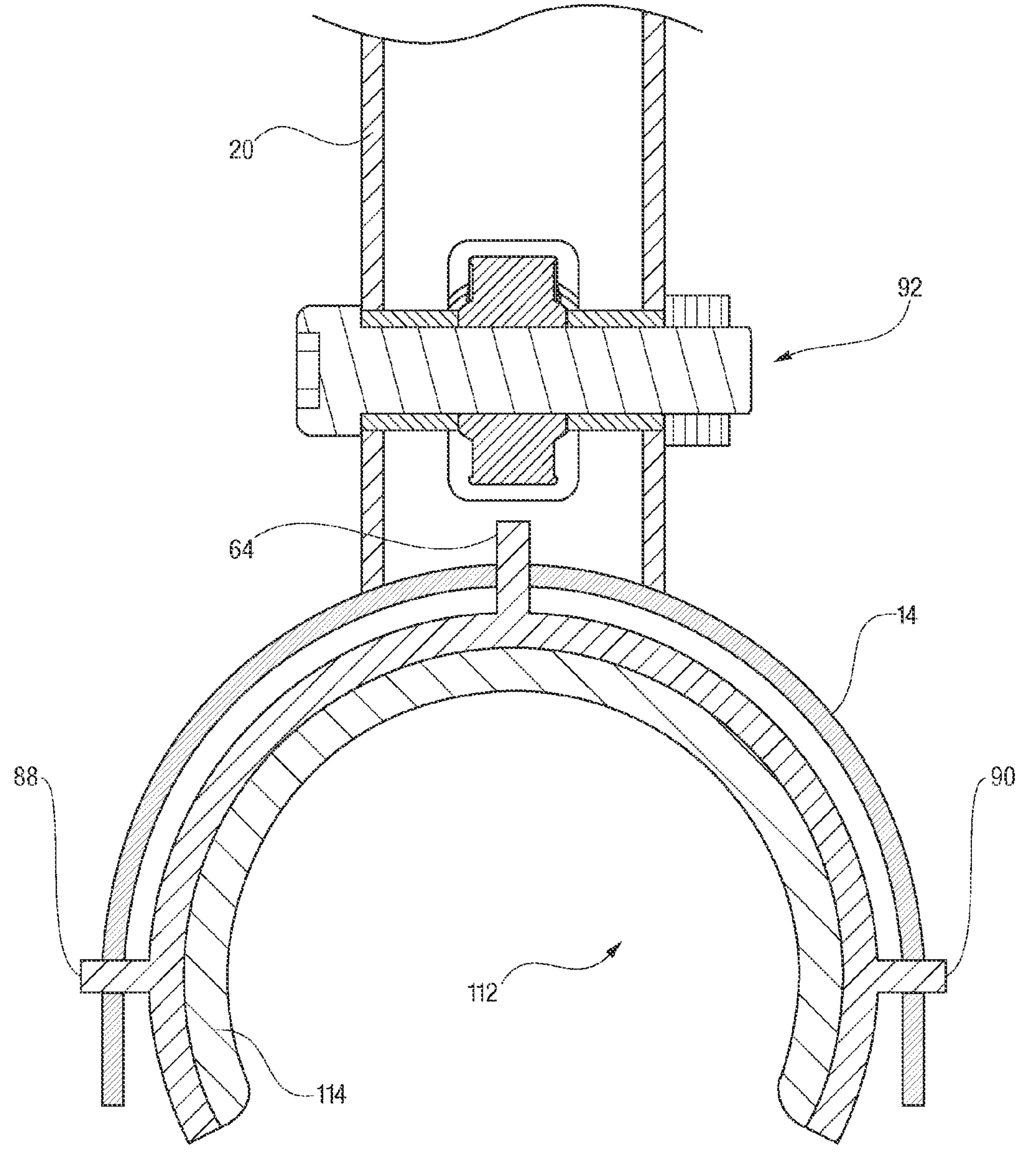
FIG. 16 is a flat plan view of a smooth-wall pipe flat rubber clamp.

FIG. 15 shows a front perspective view of a smooth-wall pipe flat rubber clamp 112 having a flat, friction-enhancing collar 114 configured to contact a surface of the smooth-wall pipe (not shown) whenever the clamp 112 is applied to the pipe. The friction-enhancing collar may be made of any friction-enhancing compound such as rubber or polymer compounds, etc. The friction-enhancing collar has a width diameter at least fifty percent of a width diameter of the first frame 14. FIG. 16 shows a flat plan view of a smooth-wall pipe flat rubber clamp 112 for clarity.

Figure 17:
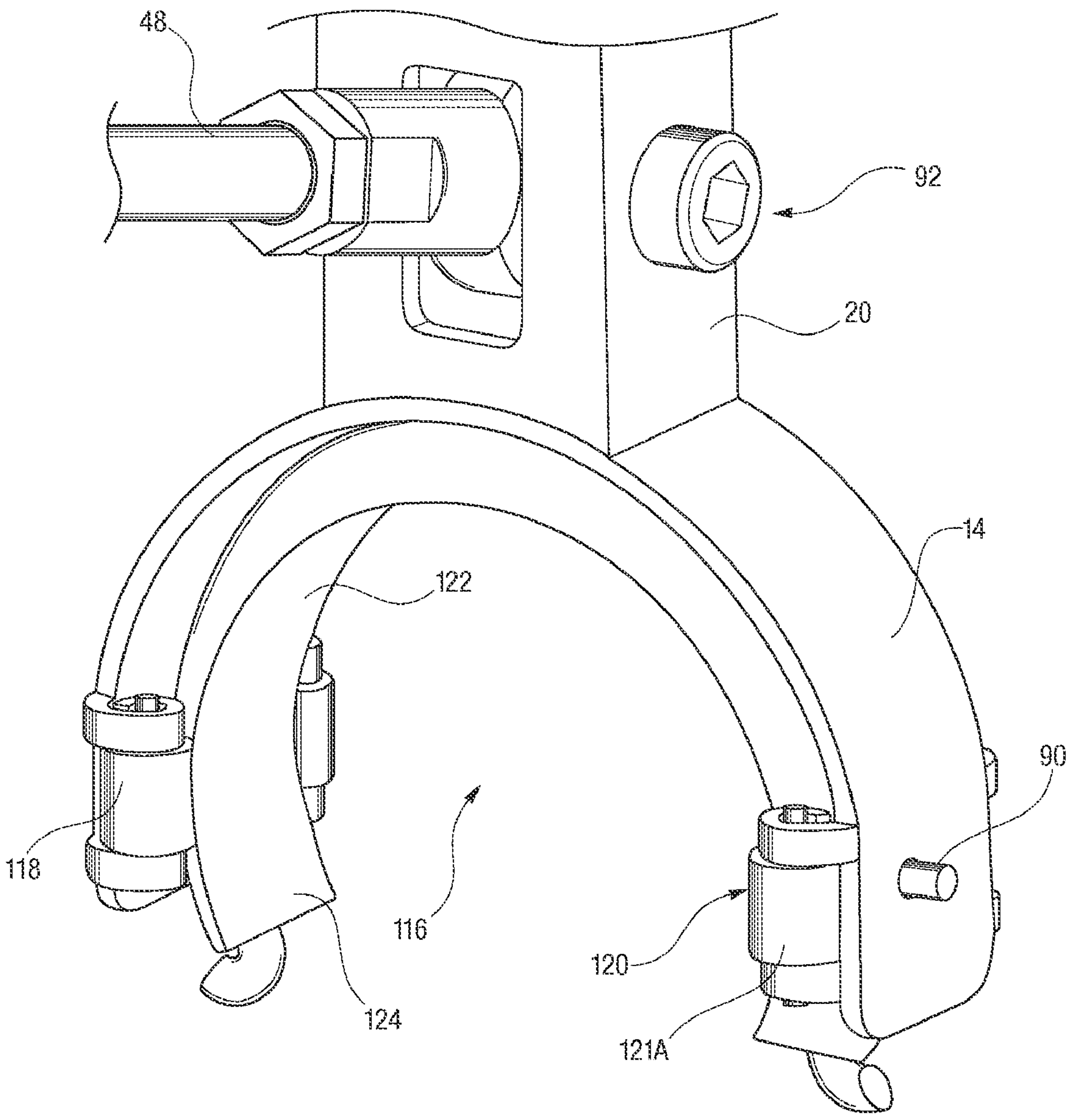
FIG. 17 is a front perspective view of a smooth-wall pipe outside roller clamp.
Figure 18:
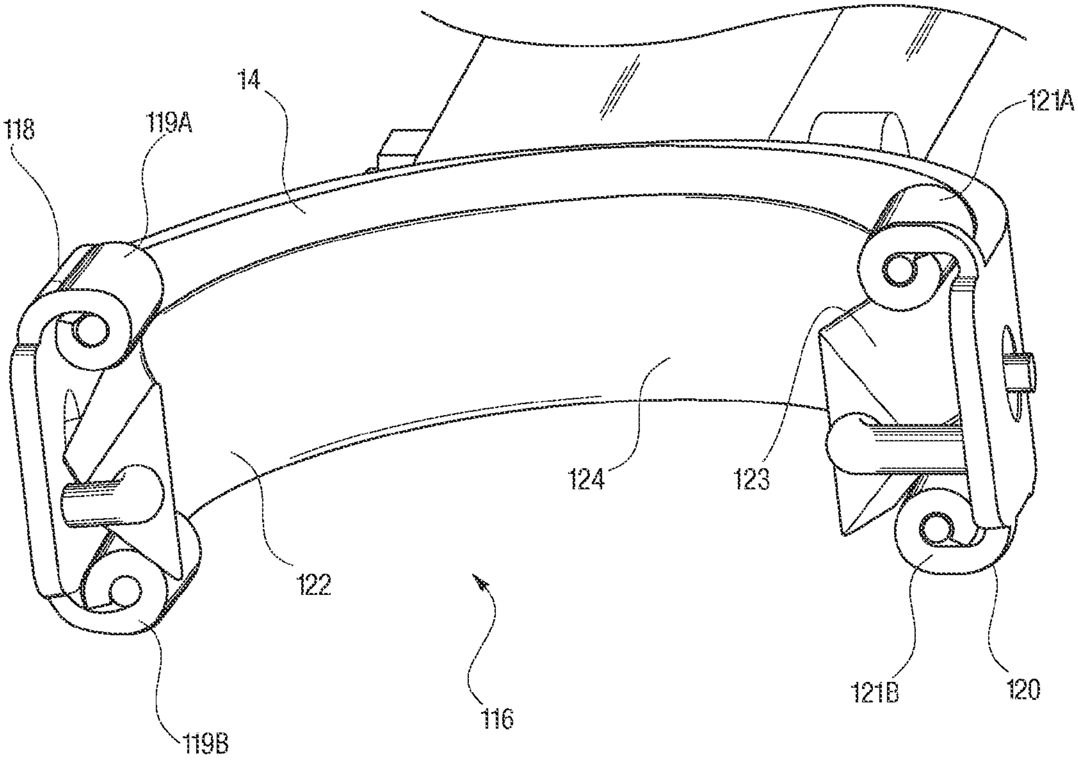
FIG. 18 is a bottom perspective view of the FIG. 17 smooth-wall pipe outside roller clamp.
Figure 19:
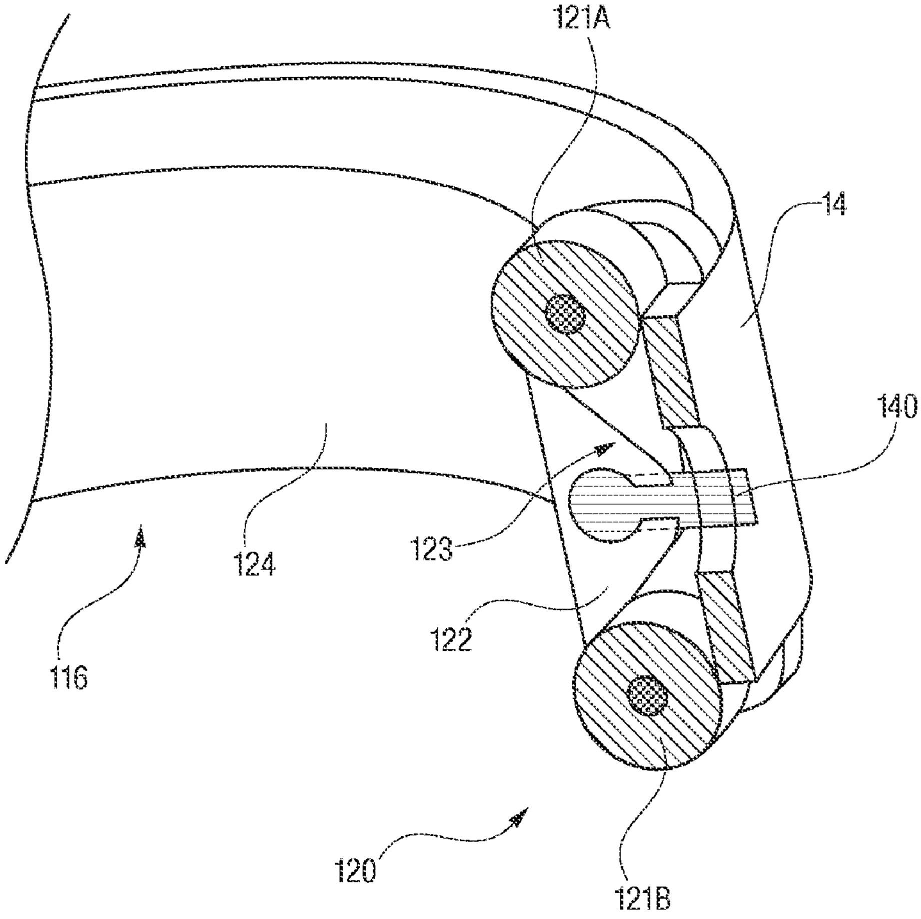
FIG. 19 is a fragmentary, magnified bottom perspective view of the FIG. 17 smooth-wall pipe outside roller clamp.

FIGS. 17-19 are front perspective views of a smooth-wall pipe outside roller clamp 116. The outside roller clamp 116 includes at least one and preferably two outside roller pairs 118, 120 that support a pyramid collar 122. Roller pair 118 includes a first pair of rollers 119A, 119B, and roller pair 120 includes a second pair of rollers 121A, 122B. As best shown in FIG. 19, the pyramid collar includes a flat contact surface 124 for contacting a smooth-wall pipe or a corrugated pipe 18. The contact surface 124 may also be in the form of a surface appropriate for engaging the corrugated pipe 18 such as a ring 82, or reverse ring 96, etc. The pyramid collar 122 also includes a pyramid-shaped back side 123 including a first ramp 125 and a second ramp 126 disposed in symmetrical, mirror image association. First roller pair 118 and a second roller pair 120 are secured between the frame 14 and the pyramid collar 122 so that motion of the frame 14 in a direction parallel to the flow axis 68 of a pipe within the outside roller clamp 116 causes one of a pair of rollers in each of the roller pairs 118, 120 to move up one of the ramps 125, 126 of the pyramid collar 122.

Figure 20:
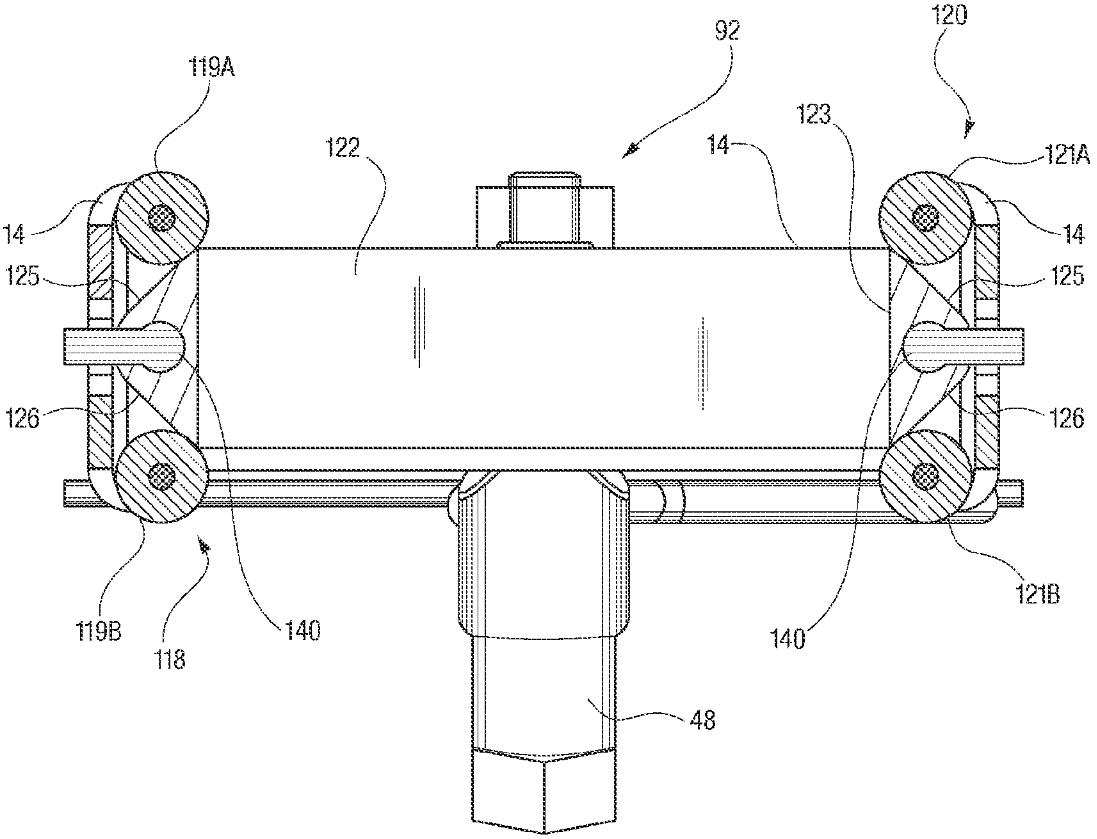
FIG. 20 is a bottom plan view of the FIG. 17 smooth-wall pipe outside roller clamp.

That motion up one of the ramp 125, 126 increases pressure upon the pyramid collar 122 to contact the pipe within the outside roller clamp 116. To permit the pyramid collar 122 to have limited motion within the frame 14, a first flexible collar connector 140 and a second flexible collar connector 141 may secure the pyramid collar 122 to the frame 14 to permit limited movement of the ramps 125, 126 along the roller clamps 118, 120. It is to be understood that the outside roller clamp 116 may include a pyramid collar 122 having differing types of contact surfaces configured to engage either a smooth-wall pipe (not shown) or a corrugated pipe 18. FIG. 20 is a bottom perspective view smooth-wall outside roller clamp 116 of FIGS. 17-19.

Figure 21:
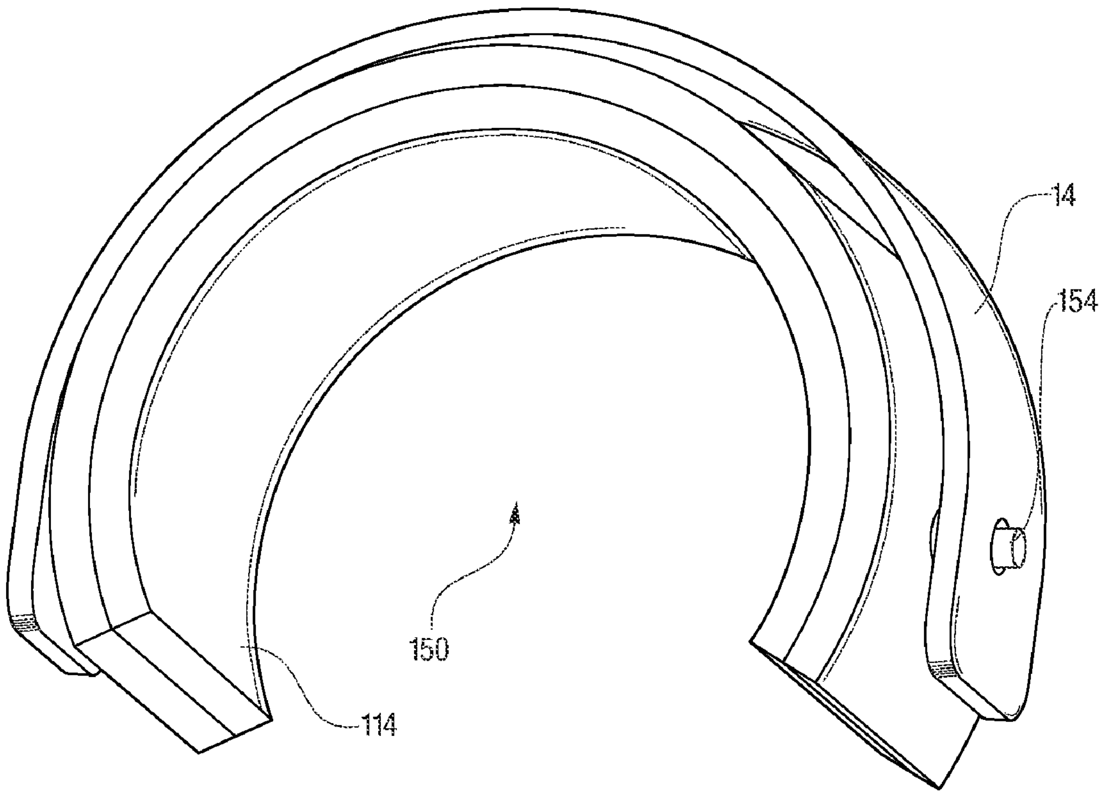
FIG. 21 is a perspective view of a smooth-wall pipe ball and socket clamp.
Figure 22:
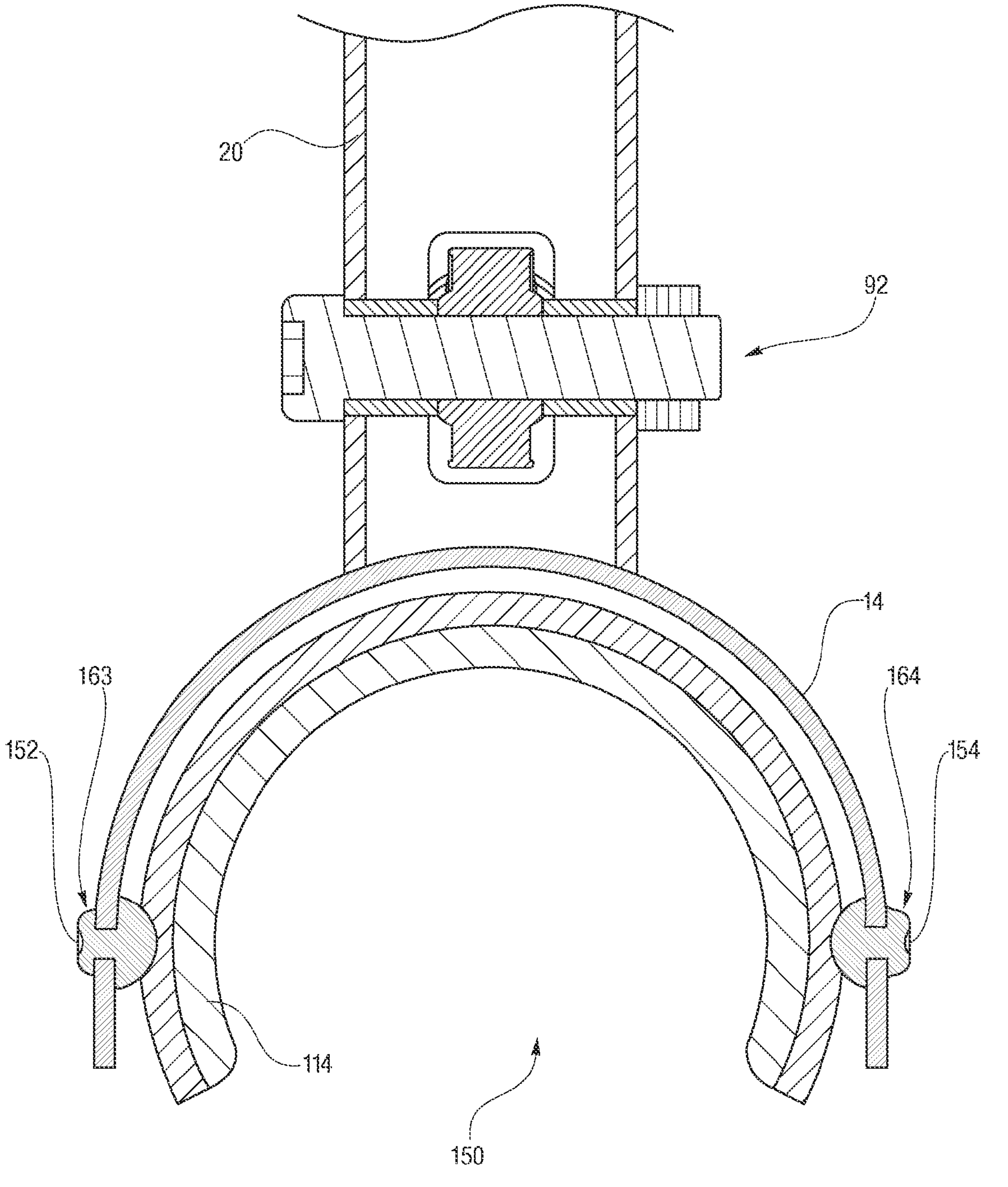
FIG. 22 is a front plan view of a smooth-wall pipe ball and socket clamp.
Figure 23:
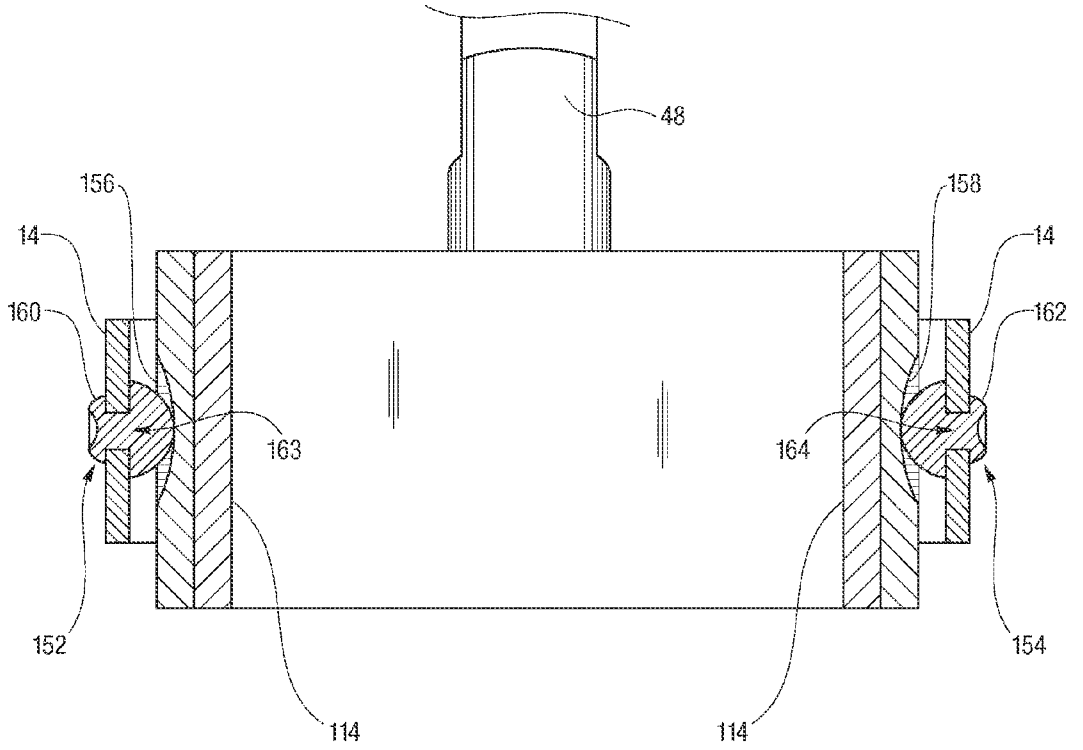
FIG. 23 is a bottom plan view of the FIG. 22 ball and socket clamp.

FIG. 21 is a perspective view of a smooth-wall pipe ball-and-socket clamp 150 having at least one and preferably a pair of ball-and-socket clamp connectors 152, 154 on opposed sides of the frame 14. The ball-and-socket clamp connectors 152, 154 are best shown in FIGS. 22-23 securing a smooth-wall pipe flat, friction-enhancing collar 114. However, the ball-and-socket clamp 150 may be configured to secure any described or known clamp structure for securing the pipe securing heads 12, 30 to a smooth wall or corrugated pipe 18. Each of the first and second ball-and-socket clamp connectors 152, 154 include a non-circular, football-shaped, slide socket 156, 158 shown in FIG. 23. (For purposes herein, the word "football" is to mean the non-spherical American "football".) Each slide socket 156, 158 may be similar to two elliptical shapes secured in mirror image association, or any similar shape. First and second balls 160, 162, are secured in ball slots 163, 164 the frame 14 and rest within the respective slide sockets 156, 158.

Upon motion of the frame 14 in a direction parallel to a flow axis 68 through a pipe 18 within the ball-and-socket clamp 150, the first and second balls 160, 162 slide from central, deepest portions of the slide sockets 156, 158 toward either of the shallower edges of the sockets 156, 158, thereby producing an additional pressure on the friction enhancing collar 114 secured to the frame 14. That additional pressure forces the friction enhancing collar 114 away from the frame 14 to enhance friction upon the pipe 18 in contact with the friction enhancing collar 114. This is best shown in the FIG. 23 bottom plan view of the ball and socket clamp 150. Therefore, to position the ball-and-socket clamp 150 upon a pipe 18, a minimal amount of expansion of the frame 14 or compression of the pipe 18, or both, is required to properly position the heads 12, 30 securing ball-and-socket clamps 150. However, as the tool handles are pulled apart to move the pipes 18, 36 together, much grabbing force or friction is generated upon the pipes 18, 36 by the motion of the heads 12, 30 moving in a direction parallel to the flow axis 68 of the pipe 18, 36. This is also the case for the outside roller clamp 116. Therefore, if the pipe joining tool 10 is using the outside roller clamp 116 or the ball-and-socket clamp 150, the pipe securing heads 12, may be configured to have greater clearances for securing the heads 12, 30 to the pipes 18, 36 for easier attachment and removal of the heads 12, 30 to and from the pipes 18, 36.

The pipe joining tool 10 also includes any pipe securing clamp means known in the art that are capable of achieving the described function of selectively and detachably securing the pipe securing heads 12, 30 to a pipe 18 in such a manner as to apply adequate attachment of the clamp means to the pipe 18 to support movement by the pipe securing heads 12, 30 in a direction parallel to the direction of the flow axis 68 through the pipe 18.

While the present disclosure has been presented above with respect to the described and illustrated embodiments of pipe joining tool 10, it is to be understood that the disclosure is not to be limited to those alternatives and described embodiments. For example, while the handles 52, 54 are shown in a manner configured for manual operation by hands of a laborer, the handles can also be configured for being secured to and moved by mechanical, electro-mechanical or hydraulic, etc. actuators, which actuators may be controlled by an automated, electronic or computerized controller, etc. Accordingly, reference should be made primarily to the following claims rather than the forgoing description to determine the scope of the disclosure.

What is claimed is:

1. A pipe joining tool (10) for joining pipes (18, 36, 58) together, the tool (10) comprising:

a. a first pipe securing head (12) including a first downward facing C-shaped frame (14), a first pipe securing clamp means (16) secured within the first downward facing C-shaped frame (14) for selectively and detachably securing the first pipe securing head (12) to a first pipe (18), a first neck (20) having a bottom end (22) and an opposed top end (24), the bottom end (22) being secured to a central portion (26) of the first downward facing C-shaped frame (14) and the top end (24) extending away from the first frame (14) in a direction away from a first central opening (28) defined by the first downward facing C-shaped frame (14);

b. a second pipe securing head (30) including a second downward facing C-shaped frame (32), a second pipe securing clamp means (34) secured within the second downward facing C-shaped frame (32) for selectively and detachably securing the second pipe securing head (30) to a second pipe (36), a second neck (38) having a bottom end (40) and an opposed top end (42), the bottom end (40) being secured to a central portion (44) of the second downward facing C-shaped frame (32) and the top end (42) extending away from the second frame (32) in a direction away from a second central opening (46) defined by the second downward facing C-shaped frame (32);

c. a pivot rod (48) having a first end (50) of the pivot rod (48) pivotally secured to the first neck (20) between the bottom end (22) and the top end (24) of the first neck (20) and the pivot rod (48) having an opposed second end (52) of the rod (48) pivotally secured to the second neck (38) between the bottom end (40) and the top end (42) of the second neck (38); and, d. a first handle (54) secured to the top end (24) of the first neck (20) and extending away from the first neck (20) in a direction away from the central opening (28) defined by the first downward facing C-shaped frame (14), and a second handle (56) secured to the top end (42) of the second neck (38) and extending away from the second neck (38) in a direction away from the central opening (46) defined by the second downward facing C-shaped frame (32), the first and second handles (54, 56) and pivot rod (50) configured so that movement of the first and second handles (54, 56) away from each other causes the first pipe securing head (12) and second pipe securing head (30), to move toward each other, and movement of the first and second handles (54, 56) toward each other causes the first pipe securing head (12) and second pipe securing head (30), to move away from each other.

2. The pipe joining tool (10) of claim 1, wherein the first pipe securing clamp means (16) is pivotally secured within the first downward facing C-shaped frame (14) for limited rotation about a first pivot axis (62) passing between opposed sides of the first C-shaped frame (14).

3. The pipe joining tool (10) of claim 2, wherein, the first pipe securing clamp means (16) includes a pivot stop (64) configured to extend from the first clamp means (16) into a pivot slot (66) defined within the first downward facing C-shaped frame (14) to limit pivoting of the first clamp means (16) about the first pivot axis.

4. The pipe joining tool (10) of claim 2, wherein the first pivot stop (64) and the first pivot slot (66) are cooperatively configured to permit pivoting of the first pipe securing clamp means (16) around the first pivot axis (62) about ten degrees above or below a plane defined as extending from the first pivot axis (62) and parallel to a plane defined by the first central opening (26).

5. The pipe joining tool (10) of claim 1, further comprising a pivot plate (70) pivotally secured by a pivot bracket (72) to the first neck (20) and dimensioned to cover an area at least as big as the central openings (28) of the first pipe securing head (12), wherein the pivot plate (70) is configured to selectively pivot from a storage position (76) adjacent the neck (20) to a blocking position adjacent and covering the central opening (28) of the first pipe securing head (12).

6. The pipe joining tool (10) of claim 1, wherein at least one of the first pipe securing clamp means (16) and the second pipe securing clamp means (34) further comprises a corrugated pipe ring clamp (80) secured to the first frame (14) and including a ring (82) configured to be inserted within valleys (84) between corrugations (86) of the first pipe (18).

7. The pipe joining tool (10) of claim 1, wherein at least one of the first pipe securing clamp means (16) and the second pipe securing clamp means (34) further comprises a corrugated pipe reverse ring clamp (94) secured to the first frame (14) and that includes a reverse ring (96) defining a valley (98) within the reverse ring (96) that is dimensioned to receive a corrugation (86) of the first pipe (18).

8. The pipe joining tool (10) of claim 1, wherein at least one of the first pipe securing clamp means (16) and the second pipe securing clamp means (34) further comprises a smooth-wall reverse ring clamp (100) secured to the first frame (14) and having a reverse ring (96) secured to the frame (14) and defining a valley (98) within the reverse ring (96), wherein the reverse ring (96) also includes a friction rib (102) secured within and extending out of the valley (98) of the reverse ring (96).

9. The pipe joining tool (10) of claim 1, wherein at least one of the first pipe securing clamp means (16) and the second pipe securing clamp means (34) further comprises a smooth-wall pipe rubber lip clamp (104) secured to the first frame (14) and having a rubber lip (106) secured to the frame (14) wherein the rubber lip (106) has a width diameter at least fifty percent of a width diameter of the first frame (14).

10. The pipe joining tool (10) of claim 1, wherein at least one of the first pipe securing clamp means (16) and the second pipe securing clamp means (34) further comprises a smooth-wall pipe rubber rings clamp (108) secured to the first frame (14) and having a plurality of friction enhancing rings (110A, 110B, and 110C) secured to the first frame (14).

11. The pipe joining tool (10) of claim 1, wherein at least one of the first pipe securing clamp means (16) and the second pipe securing clamp means (34) further comprises a smooth-wall pipe flat rubber clamp (112) secured to the first frame (14) and having a flat, friction-enhancing collar (114) configured to contact a surface of a pipe (18), wherein the friction-enhancing collar (114) has a width diameter at least fifty percent of a width diameter of the first frame (14) and is made of a friction-enhancing compound.

12. The pipe joining tool (10) of claim 1, wherein at least one of the first pipe securing clamp means (16) and the second pipe securing clamp means (34) further comprises a smooth-wall pipe outside roller clamp (116) secured to the first frame (14) and including at least one outside roller pair (118) supporting a pyramid collar (122), the outside roller pair (118) including a pair of rollers (119A, 119B), wherein the pyramid collar (122) includes a pipe contact surface means (124) having at least one pipe contact surface means (80, 96, 102, 106, 110A, 110B, 110C, 114) for contacting a pipe (18), wherein the pyramid collar (122) also includes a pyramid-shaped back side (123) including a first ramp (125) and a second ramp (126) disposed in symmetrical, mirror image association, and wherein the roller pair (118) is secured between the first frame (14) and the pyramid collar (122) so that motion of the frame (14) in a direction parallel to a flow axis (68) of the pipe (18) within the outside roller clamp (116) causes one of rollers (119A, 119B) to move up one of the ramps (125, 126) of the pyramid collar (122) to thereby move the outside roller clamp (116) away from the first frame (14) toward the pipe (18).

13. The pipe joining tool (10) of claim 1, wherein at least one of the first pipe securing clamp means (16) and the second pipe securing clamp means (34) further comprises a smooth-wall pipe ball-and-socket clamp (150) secured having at least one ball-and-socket clamp connector (152) secured to the first frame (14), wherein the ball-and-socket clamp connector (152) includes a pipe contact surface means (114) having at least one pipe contact surface means (80, 96, 102, 106, 110A, 110B, 110C, 114) for contacting a pipe (18), and wherein the ball-and-socket clamp connector also includes a non-circular slide socket (156) defined in the ball-and-socket clamp (150) in mirror image association on opposed sides of a ball (160) secured in a ball slot (163) defined in the frame (14) so that the ball (160) projects into slide socket (156) so that, upon motion of the frame (14) in a direction parallel to a flow axis (68) through the pipe (18) within the ball-and-socket clamp (150), the ball (160) slides from a central, deepest portion of the slide socket (156) toward either of shallower edges of the socket (156) to thereby move the ball-and-socket clamp (150) away from the first frame (14) toward the pipe (18).

14. A method of joining two pipes (18, 36) together with the pipe joining tool of claim 1, comprising:

a. securing handles (54, 56) of the pipe joining tool close to each other;

b. then placing a first pipe securing clamp means (16) for securing a pipe securing head (12) on to a first pipe (18) so that a pipe contact surface means (80, 96, 102, 106, 110A, 110B, 110C, 114) adjacent the first central opening (28) defined by the first pipe securing clamp means (16) contacts the first pipe;

c. then placing a second pipe securing clamp means (34) for securing a second pipe securing head (12) on to a second pipe (36) so that the pipe contact surface means (80, 96, 102, 106, 110A, 110B, 110C, 114) adjacent the second central opening (46) defined by the second pipe securing clamp means (34) contacts the second pipe (36); and, d. then expanding the handles (54, 56) of the pipe joining tool (10) away from each other to move the first pipe (18) toward and into contact with the second pipe (36).

15. The method of joining two pipes (18, 36) together of claim 14, further comprising, before expanding the handles (54, 56), pivoting a pivot plate (70) secured by a pivot bracket (72) to a first neck (20) of a first pipe securing head (12) of pipe joining tool (10) from a storage position (76) adjacent the neck (20) to a blocking position covering the central opening (28) of the first pipe securing head (12), then, when the pipes (18, 36) pulled by the tool (10) to be adjacent each other, pivoting the pivot plate (70) back to the storage position (76).

* * * * *